(12) United States Patent
Chou et al.

(10) Patent No.: US 7,186,147 B1
(45) Date of Patent: *Mar. 6, 2007

(54) PERIPHERAL DEVICE HAVING AN EXTENDED USB PLUG FOR COMMUNICATING WITH A HOST COMPUTER

(75) Inventors: Horng-Yee Chou, Palo Alto, CA (US); Ren-Kang Chiou, Fremont, CA (US); Edward W. Lee, Mountain View, CA (US)

(73) Assignee: Super Talent Electronics, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/939,051

(22) Filed: Sep. 10, 2004

Related U.S. Application Data

(63) Continuation-in-part of application No. 10/605,146, filed on Sep. 11, 2003, now Pat. No. 6,854,984.

(51) Int. Cl.
*H01R 24/00* (2006.01)
(52) U.S. Cl. .................................... 439/660
(58) Field of Classification Search ............... 439/660, 439/362, 535; 710/301, 300, 37, 74; 361/685; 235/492
See application file for complete search history.

(56) References Cited

U.S. PATENT DOCUMENTS

| | | | |
|---|---|---|---|
| 5,330,360 A | 7/1994 | Marsh et al. | |
| 5,339,222 A | 8/1994 | Simmons et al. | |
| 5,386,340 A | 1/1995 | Kurz | |
| 5,420,412 A * | 5/1995 | Kowalski | 235/492 |
| 5,450,396 A | 9/1995 | Havermans | |
| 5,476,387 A | 12/1995 | Ramey et al. | |
| 5,725,395 A | 3/1998 | Lee et al. | |
| 5,941,733 A | 8/1999 | Lai et al. | |
| 6,027,375 A | 2/2000 | Wu et al. | |
| 6,091,605 A | 7/2000 | Ramey et al. | |
| 6,165,016 A | 12/2000 | Lai | |
| 6,314,479 B1 | 11/2001 | Frederick et al. | |
| 6,334,793 B1 | 1/2002 | Amoni et al. | |
| 6,354,883 B2 | 3/2002 | Jaing | |
| 6,385,677 B1 | 5/2002 | Yao | |
| 6,439,464 B1 | 8/2002 | Fruhauf et al. | |
| 6,453,371 B1 | 9/2002 | Hampson et al. | |
| 6,533,612 B1 | 3/2003 | Lee et al. | |
| 6,561,421 B1 | 5/2003 | Yu | |
| 6,567,273 B1 | 5/2003 | Lie et al. | |
| 6,578,768 B1 | 6/2003 | Binder et al. | |

(Continued)

OTHER PUBLICATIONS

"PCI Express* Architecture Initiative Overview," Oct. 2003, pp. 1-30, Intel.

(Continued)

*Primary Examiner*—Alexander Gilman
(74) *Attorney, Agent, or Firm*—IP Strategy Group, P.C.

(57) ABSTRACT

A peripheral device having a device processor, a multi-personality bus switch, and an extended Universal-Serial Bus (USB) plug is disclosed. The peripheral device is capable of communicating with a host computer using one or more protocols. The extended Universal-Serial Bus (USB) plug includes an extended pin substrate, the extended pin substrate and at least some of a plurality of contacts thereon being dimensioned to be mechanically compatible with an industry-standard USB socket. The extended USB plug further lacks an industry-standard cover associated with an industry-standard USB plug, thereby causing the extended USB plug to be thinner than the industry-standard USB plug.

43 Claims, 24 Drawing Sheets

U.S. PATENT DOCUMENTS

| | | |
|---|---|---|
| 6,581,122 B1 | 6/2003 | Sarat |
| 6,599,152 B1 | 7/2003 | Oliphant et al. |
| 6,602,088 B1 * | 8/2003 | Zhu .......................... 439/382 |
| 6,628,498 B2 | 9/2003 | Whitney et al. |
| 6,658,516 B2 | 12/2003 | Yao |
| 6,692,268 B2 | 2/2004 | Kung et al. |
| 6,692,312 B1 | 2/2004 | Semmeling et al. |
| 6,705,902 B1 | 3/2004 | Yi et al. |
| 6,712,646 B2 | 3/2004 | Shindo |
| 6,719,570 B2 | 4/2004 | Tsuchioka |
| 6,745,267 B2 * | 6/2004 | Chen et al. ................... 710/74 |
| 6,752,321 B1 * | 6/2004 | Leaming ..................... 235/492 |
| 6,763,408 B1 | 7/2004 | Sonoda |
| 6,778,401 B1 | 8/2004 | Yu et al. |
| 6,801,971 B1 | 10/2004 | Devine et al. |
| 6,813,662 B2 | 11/2004 | Park |
| 6,854,984 B1 | 2/2005 | Lee et al. |
| 6,857,897 B2 | 2/2005 | Conn |
| 6,860,609 B2 | 3/2005 | Olson et al. |
| 6,871,244 B1 * | 3/2005 | Cahill et al. .................. 710/62 |
| 6,874,044 B1 | 3/2005 | Chou et al. |
| 6,890,207 B2 | 5/2005 | Kobayashi |
| 2003/0094490 A1 | 5/2003 | Lee |
| 2003/0100203 A1 | 5/2003 | Yen |
| 2003/0104835 A1 | 6/2003 | Douhet |
| 2003/0145141 A1 | 7/2003 | Chen et al. |
| 2004/0087213 A1 | 5/2004 | Kao |
| 2005/0059301 A1 | 3/2005 | Chou et al. |

OTHER PUBLICATIONS

"PMCIA Connector," Specifications sheet, 1 page, Foxconn.
"Engineering Change Notice: Rounded Chamfer," 3 pages.
"Product Specification: PCMCIA Memory Card Connector," Specification No.: PS98007 Rev. 2, Dec. 2, 2001, 1 page.
"USB Engineering Change Notice: Pull-up/pull-down resistors," 2 pages.
"7.1.5.1 Low/Full-speed Device Speed Identification," 3 pages.
Larky et al., "You've Come a Long Way, USB (history and future of USB port technology)," Electronic News, Jul. 23, 2001, 2 pages.
Brewer et al., "PCI Express Technology," Feb. 2004 White Paper, Dell, pp. 1-11.
"Errata for 'USB Revision 2.0 Apr. 27, 2000' as of May 28, 2002," 7 pages.
"Design Objectives: ExpressCard Connector," 108-5923, Aug. 27, 2003, Tyco Electronics, pp. 1-10.
"USB 2.0 Specification Engineering Change Notice (ECN) #1: Mini-B connector," Oct. 20, 2000, 23 pages.
"Errata for 'USB Revision 2.0 Apr. 27, 2000' as of Dec. 7, 2000," pp. 1-31.
"ExpressCard(TM) Technology: The New Standard for High-Performance, Low-Cost I/O Expansion for Desktop and Mobile Systems," 1 page.
"The ExpressCard(TM) Standard—The Next Generation PC Card Technology," Oct. 2003, PCMCIA, pp. 1-4.
"USB Engineering Change Notice: Interface Association Descriptors," pp. 1-5.
"On-The-Go Supplement to the USB 2.0 Specification: Revision 1.0a," Jun. 24, 2003, 77 pages.
Bhatt et al., "Creating a Third Generation I/O Interconnect," www.express-lane.org, pp. 1-11.
"PMCIA Socket Connector," Specifications, 1 page, FoxConn.
"Electronic Interconnect Devices (Connectors)," 9 pages.
"Reference Material: A guide to connector terminology," 12 pages.
"Diagram for Tyco," 3 pages.
"Connector Supports Removable ExpressCardTM modules," Jun. 27, 2005, 2 pages.
"Notice of Office Action," mailed Apr. 6, 2005, for U.S. Appl. No. 10/834,457, filed Apr. 28, 2004; Inventors: Chou et al.
"Notice of Office Action," mailed Apr. 4, 2005, for U.S. Appl. No. 10/835,423, filed Apr. 28, 2004; Inventors: Chou et al.
"Notice of Office Action," mailed Apr. 19, 2005, for U.S. Appl. No. 10/834,615, filed Apr. 28, 2004; Inventors: Chou et al.
"Notice of Office Action," mailed Aug. 15, 2005, for U.S. Appl. No. 10/888,105, filed Jul. 9, 2004; Inventors: Wang et al.
"Notice of Office Action," mailed Aug. 22, 2005, for U.S. Appl. No. 10/938,691, filed Sep. 10, 2004; Inventors: Chou et al.
"Notice of Office Action," mailed Dec. 15, 2005 for U.S. Appl. No. 10/834,457, filed Apr. 28, 2004; Inventors: Chou et al.
"Notice of Office Action," mailed Oct. 31, 2005 for U.S. Appl. No. 10/834,615, filed Apr. 28, 2004; Inventors: Chou et al.
"Notice of Office Action," mailed Dec. 29, 2005, for U.S. Appl. No. 10/835,423, filed Apr. 28, 2004; Inventors: Chou et al.
"Notice of Office Action," mailed Jan. 17, 2006, for U.S. Appl. No. 10/888,105, filed Jul. 9, 2004; Inventors: Wang et al.
U.S. Appl. No. 10/854,004; filed May 25, 2004; Inventors: Chou et al.
U.S. Appl. No. 11/076,514, filed Mar. 8, 2005; Inventors: Yu et al.
"Notice of Office Action," mailed Mar. 8, 2006, for U.S. Appl. No. 10/834,457, filed Apr. 28, 2004; Inventors: Chou et al.
"Notice of Office Action," mailed Mar. 8, 2006, for U.S. Appl. No. 10/835,423, filed Apr. 28, 2004; Inventors: Chou et al.
"Notice of Office Action," mailed Mar. 7, 2006, for U.S. Appl. No. 10/834,615, filed Sep. 10, 2004; Inventors: Chou et al.
"Notice of Office Action," mailed Feb. 8, 2006, for U.S. Appl. No. 10/938,691, filed Sep. 10, 2004; Inventors: Chou et al.

* cited by examiner

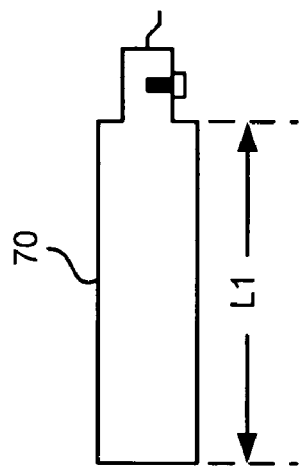
Fig. 4C
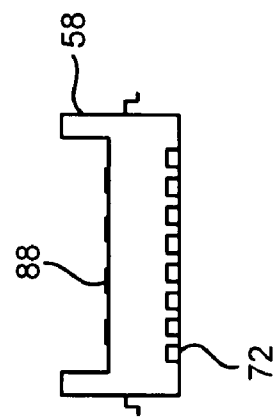
Fig. 4B
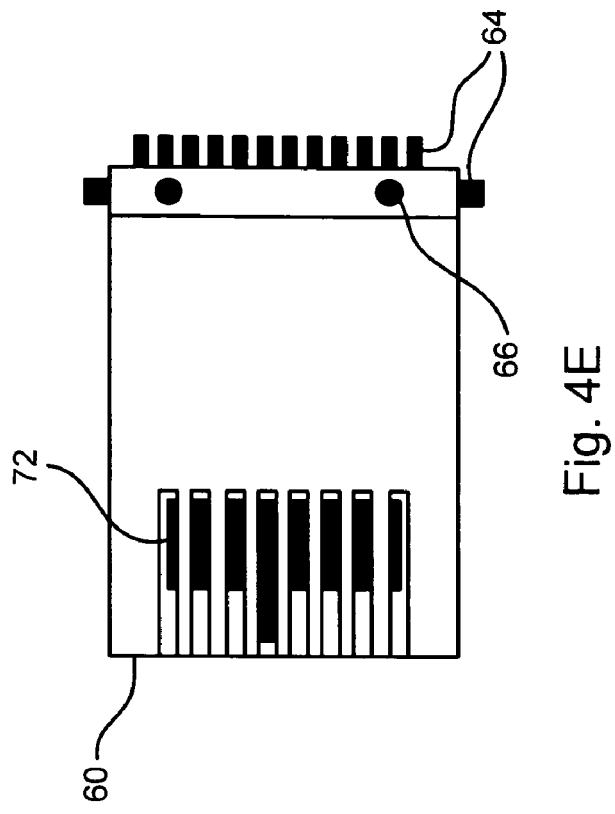
Fig. 4E
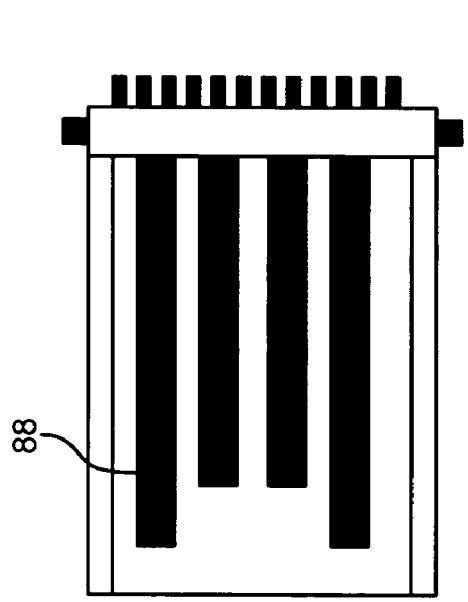
Fig. 4A
Fig. 4D

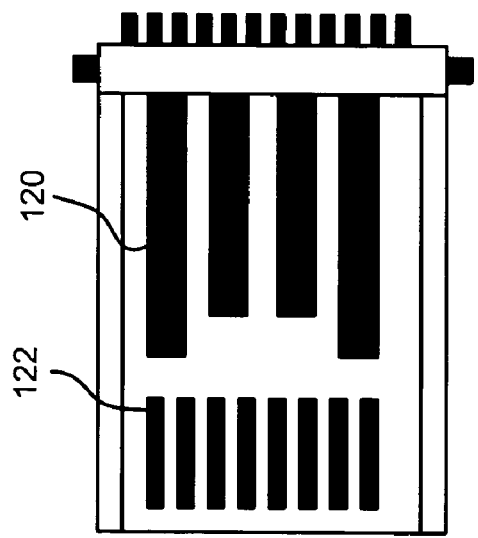
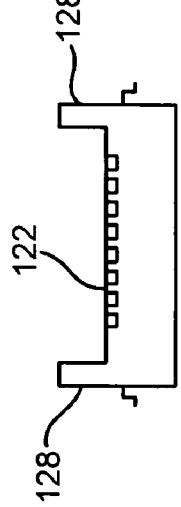
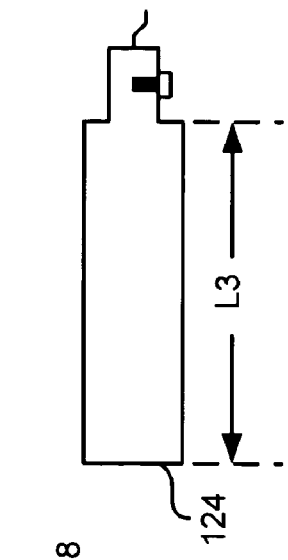
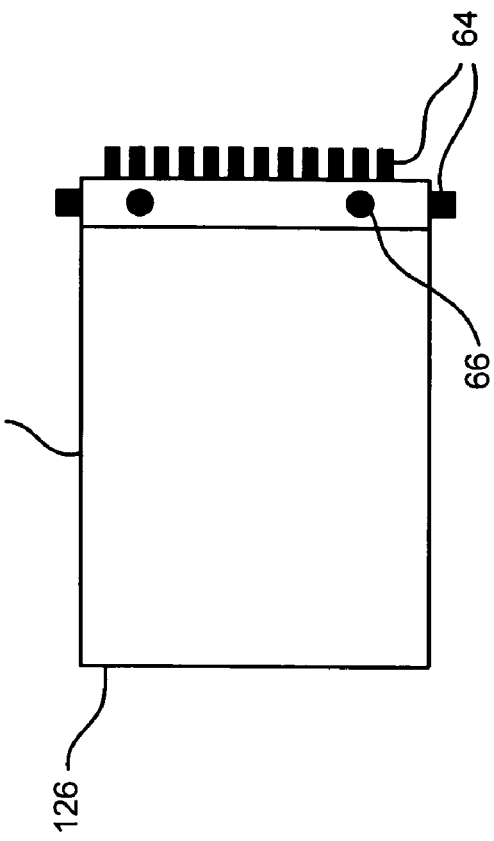

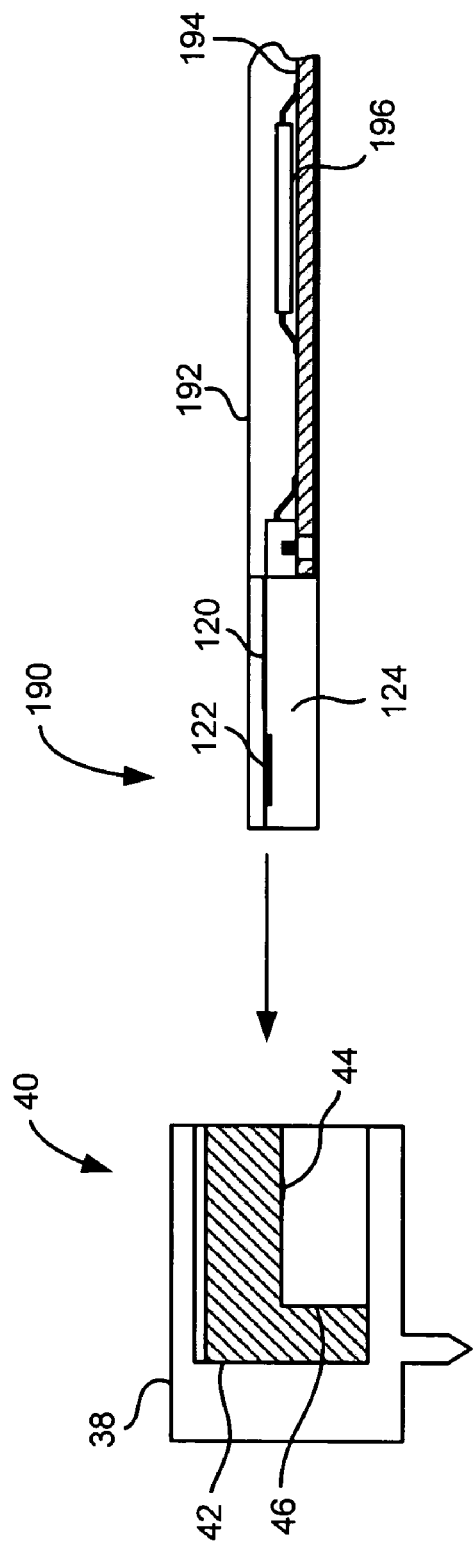
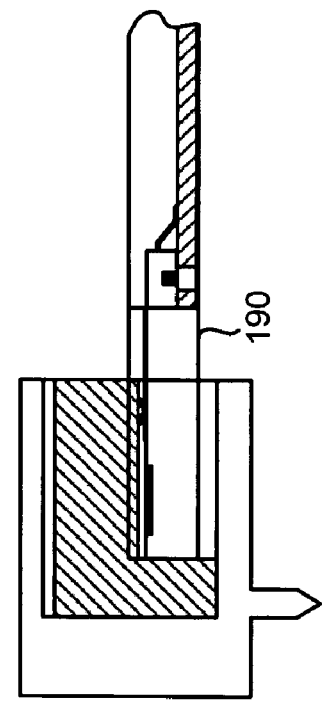
Fig. 5G
Fig. 5H

Fig. 7

| SIDE | PIN-OUT | USB | PCI EX | SATA | 1394 |
|---|---|---|---|---|---|
| A | 1 | 5V | 5V | 5V | 5V |
| A | 2 | D- | REFCLK- | D- | D- |
| A | 3 | D+ | REFCLK+ | D+ | D+ |
| A | 4 | GND | GND | GND | GND |
| B | 1 | 3.3V | 3.3V | 3.3V | 3.3V |
| B | 2 | 1.5V | 1.5V | 1.5V | 1.5V |
| B | 3 | Default | PETn | T- | TPB* |
| B | 4 | Default | PETp | T+ | TPB |
| B | 5 | GND | GND | GND | GND |
| B | 6 | Default | PERn | R- | TPA* |
| B | 7 | Default | PERp | R+ | TPA |
| B | 8 | 12V | 12V | 12V | 12V |

Fig. 12

| SIDE | PIN-OUT | USB | PCI EX | SATA | 1394 |
|---|---|---|---|---|---|
| A | 1 | 5V | 5V | 5V | 5V |
| A | 2 | D- | PETn | T- | TPB* |
| A | 3 | D+ | PETp | T+ | TPB |
| A | 4 | GND | GND | GND | GND |
| B | 1 | 3.3V | 3.3V | 3.3V | 3.3V |
| B | 2 | 1.5V | 1.5V | 1.5V | 1.5V |
| B | 3 | GND | GND | GND | GND |
| B | 4 | Default | PERn | R- | TPA* |
| B | 5 | Default | PERp | R+ | TPA |
| B | 6 | 12V | 12V | 12V | 12V |

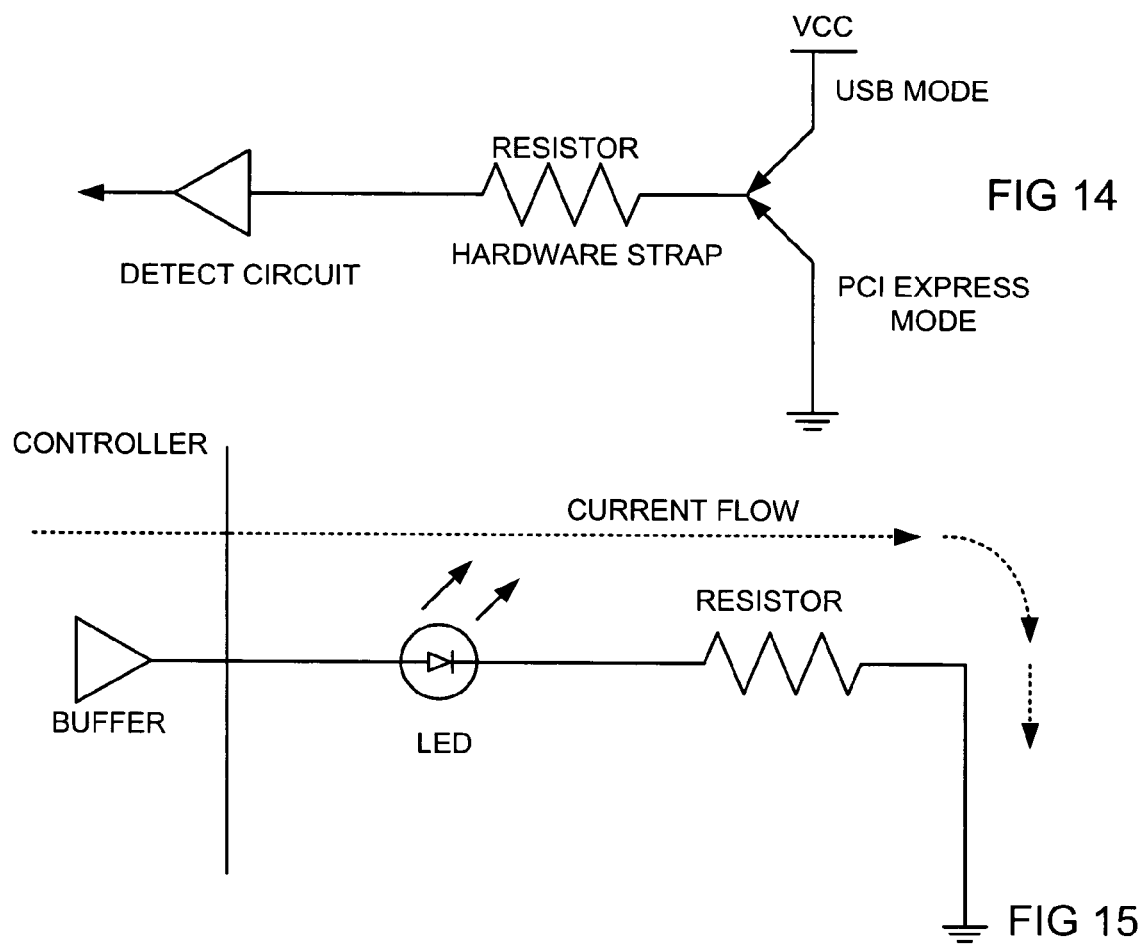

PERIPHERAL DEVICE HAVING AN EXTENDED USB PLUG FOR COMMUNICATING WITH A HOST COMPUTER

This application is a continuation-in-part of "Slim USB Connector with Spring-Engaging Depressions, Stabilizing Dividers and Wider End Rails for Flash-Memory Drive", U.S. Ser. No. 10/605,146, filed Sep. 11, 2003, now U.S. Pat. No. 6,854,984 incorporated by reference herein.

BACKGROUND OF THE INVENTION

Universal-Serial-Bus (USB) has been widely deployed as a standard bus for connecting peripherals such as digital cameras and music players to personal computers (PCs) and other devices. To facilitate discussion, FIG. 1A shows a prior-art peripheral-side USB connector. USB connector 10 is a male connector, also known as a USB plug. In the example of FIG. 1A, USB connector 10 represents a type-A USB connector. In use, USB connector 10 may be mounted on a board in the peripheral, or may be connected to the peripheral using a cable having a set of conductors. USB connector 10 can also be mounted in an opening in a plastic case (not shown) for the peripheral.

USB connector 10 contains a small connector substrate 14, which may be formed of white ceramic, black rigid plastic, or another sturdy substrate. Connector substrate 14 has four or more metal contacts 16 formed thereon. Metal contacts 16 carry the USB signals generated or received by a controller chip in the peripheral. USB signals typically include power, ground, and serial differential data D+, D−.

USB connector 10 contains a metal case that wraps around connector substrate 14. The metal case touches connector substrate 14 on three of the sides of connector substrate 14. The top side of connector substrate 14, holding metal contacts 16, has a large gap between itself and the top of the metal case. On the top and bottom of this metal case are formed holes 12.

FIG. 1B shows a host-side USB connector, also known as a female USB connector or a USB socket (receptacle). Female USB connector 20 can be an integral part of a host or PC, or can be connected by a cable. Another connector substrate 22 contains four metal contacts 24 that make electrical contact with the four metal contacts 16 of the male USB connector 10 of FIG. 1A. Connector substrate 22 is wrapped by a metal case, but three small gaps are formed between the metal case and connector substrate 22 around three sides of connector substrate 22. In FIG. 1B, these three gaps are seen on the left, right, and bottom sides of connector substrate 22 of FIG. 1B. A larger gap exists between the top of connector substrate 22 and the metal case as seen.

When male USB connector 10 of FIG. 1A is flipped over and inserted into female USB connector 20 of FIG. 1B, metal springs 18 of female USB connector 20 lock into holes 12 of male USB connector 10. This allows the metal casings to be connected together and grounded.

Currently, USB has a transfer rate of around 480 Mb/s, which is sufficient for some but not all applications. As a consequence, faster serial-bus interfaces are being introduced to address different requirements. PCI Express, at 2.5 Gb/s, and SATA, at 1.5 Gb/s and 3.0 Gb/s, are two examples of high-speed serial bus interfaces for the next generation devices, as are IEEE 1394 and Serial Attached Small-Computer System Interface (SCSI). PCI Express is an extension of the Peripheral Component Interconnect (PCI) bus protocol, which is a well-known protocol for interconnection components in a computer system. SATA stands for serial advanced technology attachment (SATA), which is an extension of the well-known AT attachment protocol employed to attach hard disks to computer systems. IEEE 1394 and SCSI are alternative bus protocols supporting high speed transfers.

Physically speaking, these other protocols (e.g., PCI-Express, SATA, IEEE 1394, SCSI, etc.) employ different form factors for their plugs and connectors. To facilitate discussion, FIGS. 2 and 3 show an ExpressCard and its connector. ExpressCard is a new removable-card form-factor that has been developed by the Personal-Computer Memory Card International Association (PCMCIA), PCI, and USB standards groups. ExpressCard 26 of FIG. 2 is about 75 mm long, 34 mm wide, and 5 mm thick and has ExpressCard connector 28.

FIG. 3 shows that ExpressCard connector 28 fits into connector or socket 30 on a host when ExpressCard 26 is inserted into an ExpressCard slot on the host. Since Express-Card connector 28 and socket 30 are 26-pin connectors, they contain a greater number of signal pins than a 4-pin USB connector and are physically larger as well.

From an electrical standpoint, the higher data transfer rates of the non-USB protocols discussed above are highly desirable for certain applications. For example, PCI Express supports data rates up to 2.5 G/b, which is much higher than the data rate for USB. As another example, the serial AT-attachment (SATA) protocol supports data rates of 1.5 Gb/s and 3.0 Gb/s, which are also higher than the data rate for USB.

However, these non-USB protocols require a greater number of contact pins between their male connectors and female sockets, which in turn necessitates the use of relatively large connectors. For example, while the ExpressCard standard is useful for its higher possible data rates, the 26-pin connectors and wider card-like form factor limit the use of ExpressCards. As another example, SATA uses two connectors, one 7-pin connector for signals and another 15-pin connector for power. Due to its clumsiness, SATA is more useful for internal storage expansion than for external peripherals.

Accordingly, the choice up to now has been between the smaller form-factor but slower USB protocol/connectors and the bulkier but faster non-USB protocol/connectors. Neither choice is desirable to implement modern high-speed, miniaturized electronic devices and peripherals.

SUMMARY OF THE INVENTION

The invention relates, in one embodiment, to a peripheral device that includes a device processor and a set of protocol processors having at least a first protocol processor, the set of protocol processors being operatively coupled to communicate with the device processor, the first protocol processor being configured to process a first protocol. There is included an extended Universal-Serial-Bus (USB) plug configured to be pluggable into an industry-standard USB socket. The extended USB plug is also configured to facilitate communication between the device processor and a host computer configured to be detachably coupled with the extended USB plug. The extended USB plug lacks an industry-standard cover associated with an industry-standard USB plug. The extended USB plug includes an extended pin substrate having an extended substrate length longer than a length of a pin substrate of the industry-standard USB plug. The extended USB plug also includes a plurality of USB plug contacts supported by the extended pin substrate and arranged in a first plug row in a direction perpendicular to a longitudinal axis of the extended USB plug, the plurality of USB plug contacts being configured to carry USB signals. The extended USB plug also includes a plurality of non-USB plug contacts supported by the extended pin substrate and arranged in a second plug row parallel to the first plug row, the plurality of non-USB plug contacts being configured to carry non-USB signals.

In another embodiment, the invention relates to a peripheral device that includes a device processor and a set of protocol processors having at least a first protocol processor. The set of protocol processors is operatively coupled to communicate with the device processor, the first protocol processor being configured to process a first protocol. There is included an extended Universal-Serial-Bus (USB) plug configured to be pluggable into an industry-standard USB socket, the extended USB plug also being configured to facilitate communication between the device processor and a host computer configured to be detachably coupled with the extended USB plug. The extended USB plug lacks an industry-standard cover associated with an industry-standard USB plug. The extended USB plug includes an extended pin substrate having an extended substrate length longer than a length of a pin substrate of the industry-standard USB plug. The extended USB plug also includes a plurality of non-USB plug contacts supported by the extended pin substrate and arranged in a first plug row in a direction perpendicular to a longitudinal axis of the extended USB plug. The plurality of non-USB plug contacts are configured to carry non-USB signals, the plurality of non-USB contacts being physically arranged on the extended pin substrate such that the plurality of non-USB contacts would not electrically couple with a plurality of USB socket contacts of the industry-standard USB socket when the extended USB plug is fully inserted into the industry-standard USB socket.

BRIEF DESCRIPTION OF THE DRAWINGS

FIGS. 4A–4E show, in accordance with embodiments of the present invention, various views of an extended USB plug.

FIGS. 5A–5E show, in accordance with embodiments of the present invention, various views of another extended USB plug.

FIGS. 5G–5H show, in accordance with embodiments of the present invention, how the extended USB plug of FIG. 5A may be inserted into an industry-standard USB socket.

FIG. 7 is a table of extended and standard pins in the extended USB connector and socket.

FIG. 12 shows an embodiment having a total of 10 pins for implementing various protocols.

FIGS. 13–15 show, in accordance with embodiments of the present invention, various mode switching and mode indication arrangements.

DETAILED DESCRIPTION OF EMBODIMENTS

Figure 1A:
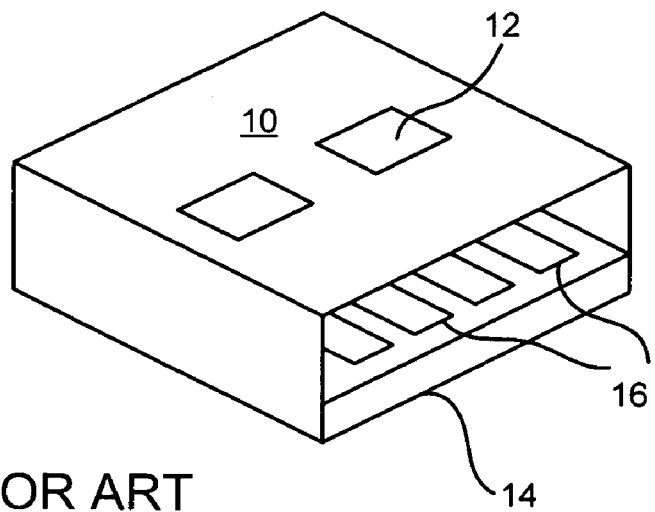
FIG. 1A shows a prior-art peripheral-side USB connector.
Figure 1B:
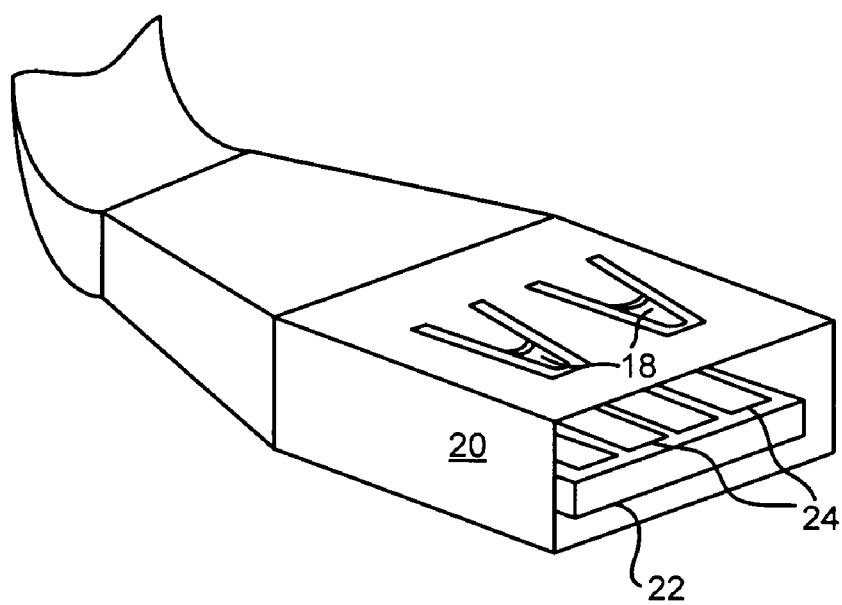
FIG. 1B shows a host-side USB connector, also known as a female USB connector or a USB socket (receptacle).
Figure 2:
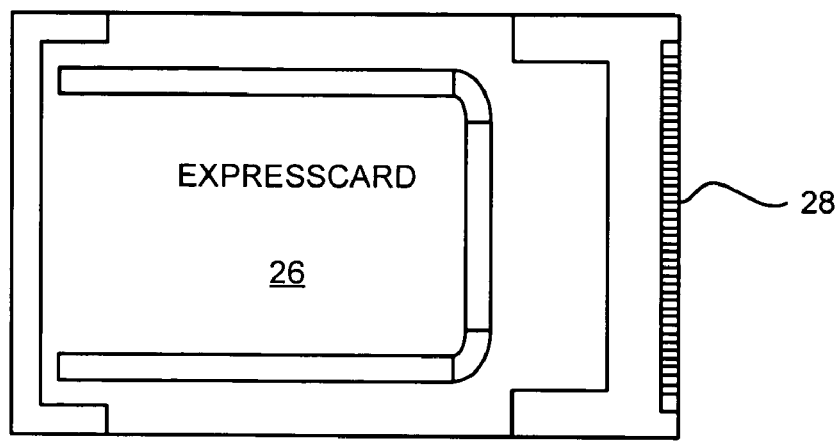
FIG. 2 shows an exemple prior art ExpressCard.
Figure 3:
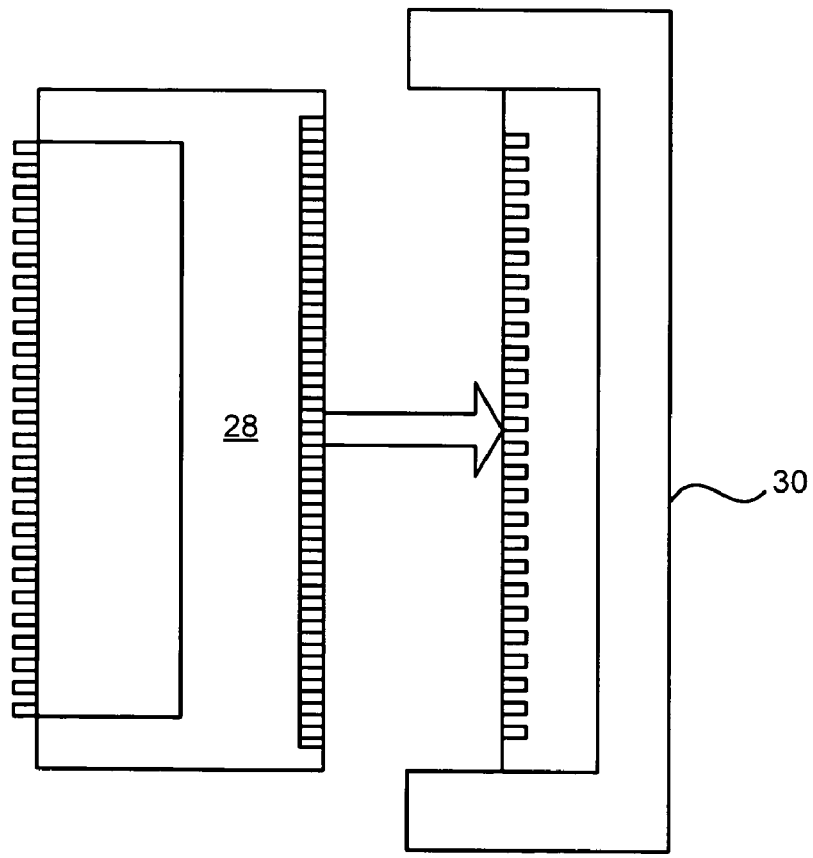
FIG. 3 shows how a prior art ExpressCard fits into a prior art ExpressCard slot.

The present invention relates to an improvement in serial-bus connectors and sockets. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have realized that there is a large installed base of standard USB hosts and devices. The USB form-factor, in addition to being widely deployed, is also small and is thus highly suitable for modern electronic devices. The inventors therefore realize that if the USB sockets and plugs can be modified to accommodate a higher number of pins, extended USB sockets and plugs can be realized that can offer the speed advantages of certain non-USB protocols (such as PCI-Express, SATA, IEEE 1394, SCSI, etc.). Because of the existence of the large base of installed USB hosts and devices, it is important, however, that the extended USB sockets and plugs be backward compatible with industry-standard USB sockets and plugs.

In an embodiment, to enable the extended USB sockets and plugs to be backward compatible with industry-standard plugs and sockets, the height and width of the extended USB sockets and plugs are kept substantially the same as the height and width of the industry-standard USB sockets and plugs for insertion compatibility. To accommodate the additional pins in order to offer the higher speeds of the non-USB protocols, the length of the extended USB plug is extended. Likewise, the length of the extended USB socket is also extended to accommodate the additional pins.

USB form-factor can be used to extend devices and hosts that can communicate at higher speeds and/or employ a variety of protocols for communication while keeping the physical size small. An extended or enhanced USB connector must fit in standard USB sockets, and an enhanced USB socket must accept standard USB connectors for backward compatibility. Since the height and width of USB connectors/sockets must remain the same for insertion compatibility, the length of each can be extended to fit additional metal contacts for additional signals.

The additional pins on the extended USB plug are arranged such that they will not short with the metal housing or case of the industry-standard USB socket. When inserted into an extended USB socket, these additional pins make electrical contact with their counterpart additional pins in the extended USB socket, thereby offering a larger number of signal pins through which communication may take place.

Likewise, the additional pins on the extended USB sockets are arranged such that they will not short with the metal housing or case of the industry-standard USB plug. When an extended USB plug is inserted into an extended USB socket, these additional pins on the extended USB socket make electrical contact with their counterpart additional pins in the extended USB plug, thereby offering a larger number of signal pins through which communication may take place.

In an embodiment, the additional pins are on the same side of the pin substrate as the industry-standard USB pins. In another embodiment, the additional pins are on the opposite side of the pin substrate as the industry-standard USB pins.

In an embodiment, the extended USB plug is formed without the metal cover or metal housing of the industry-standard USB plug. Since the metal cover is absent, the extended USB plug may be substantially thinner, allowing greater number of extended USB devices (or peripherals) to be plugged into a given host. The ability to accommodate a larger number of extended USB devices (which may employ the USB protocol or non-USB protocols) is advantageous in modern miniaturized electronic systems.

The new plug invention has about half of the thickness of the regular USB plug. It has no metal housing outside. Therefore, it is much thinner than the regular USB plug connector.

FIGS. 4A–E show a first embodiment of an extended USB plug having metal contact pins on both top and bottom surfaces of the pin substrate. In top-view FIG. 4A, pin substrate 70 supports metal contact pins 88 on the top surface. In the example of FIG. 4A, metal contact pins 88 represents the industry-standard USB pins. Pin substrate 70 is an insulator such as ceramic, plastic, or other suitable insulating material. In an embodiment, metal leads or wires may pass through pin substrate 70 to connect metal contact pins 88 to wires inside the plastic housing that connects to the peripheral device.

Reverse-side metal contact pins 72 are placed in a recess in the bottom side of pin substrate 70 near the tip 60 of the connector plug. In the example of FIGS. 4A–4E, 8 extended pins are provided to carry the extended signals (such as those associated with PCI-Express) although the number of extended pins may be variable. The recess and metal contact pins 72 may be clearly seen in FIG. 4B, representing the view of the extended USB plug from the front. Tip 60 is shown in FIG. 4E, representing the view of the extended USB plug from the bottom. In FIG. 4E, the SMT pins 64 are also shown, along with guide pins 66 for positioning the extended USB plug on the peripheral's circuit board.

In the absence of the industry-standard USB plug metal housing, ribs 58 can be added alongside contact pins 72 to prevent shorting of metal contact pins 72 against the metal housing of a USB socket. The ribs may be provided in addition to or in place of the recess feature. Reverse-side metal contact pins 72 are additional pins for extended signals of non-USB protocols, such as for PCI-Express signals. Again, metal leads or wires can pass through pin substrate 70 (pin substrate 70 is seen in the side-view FIG. 4C) to connect reverse-side metal contact pins 72 to wires inside the plastic housing that connects to the peripheral device. These wires are shown by reference number 62 in FIG. 4D, which represents the view of the extended USB plug from the rear.

The length L1 of pin substrate 70 (see FIG. 4C) is longer than the length of the industry-standard USB pin substrate. The additional pin substrate length may be, for example, 2–5 millimeters. Reverse-side metal contact pins 72 are located mostly in the extended pin substrate region beyond the length of the prior art pin substrate. As can be seen, the metal cover for the industry-standard USB plug is absent.

Figure 4F:
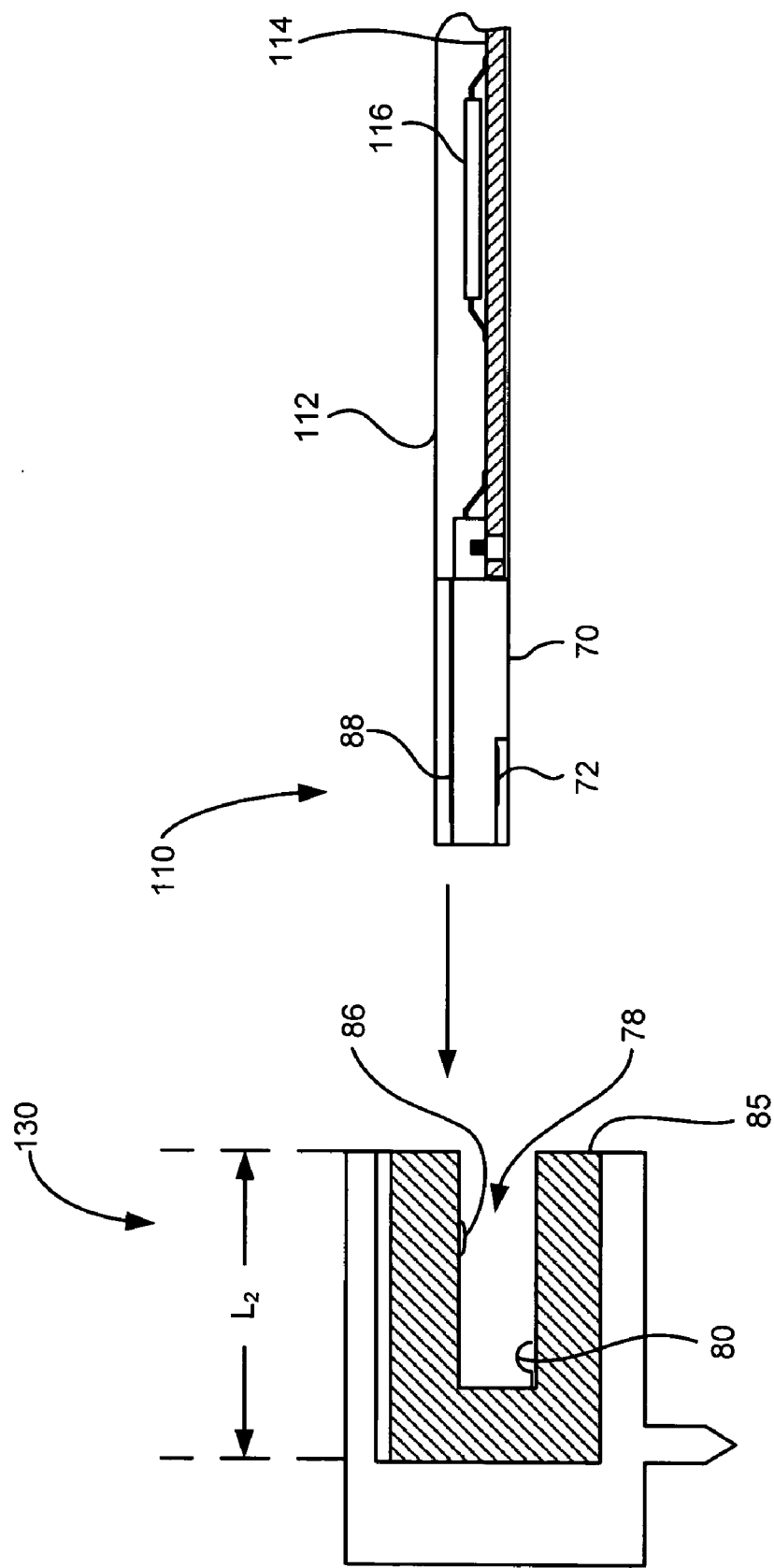
FIG. 4F shows, in accordance with an embodiment of the present invention, how the extended USB plug of FIG. 4A may be inserted into an extended USB socket.

FIG. 4F shows the extended USB plug 110 having top industry-standard USB pins 88 and bottom extended pins 72. Extended USB plug 110 is shown coupled to a peripheral PCB board 114, on which chip 116 is mounted. A housing 112 is shown, representing the peripheral housing.

A side view of an extended USB socket 130 is also shown. Extended USB socket 130 has a cavity length L2 that is longer than the cavity length of the industry-standard USB socket. In addition to the industry-standard USB top socket pins 86, there are provided a plurality of extended socket pins 80 configured to make electrical contact with extended plug pins 72 of extended USB plug 110 when extended USB plug 110 is inserted into extended USB socket 130. Extended socket pins 80 are formed in a curved shape (an example of which is shown in FIG. 4F but other shapes are possible) to provide a spring-like bias action against the extended pin of extended USB plug 110. The industry-standard USB top socket pins 86 make electrical contact with industry-standard USB top plug pins 88 when the extended USB plug 110 is inserted into extended USB socket 130.

Note that when an industry-standard USB plug, such as that shown in FIG. 1A, is inserted into extended USB socket 130, the extended socket pins 80 disposed in the extended cavity 78 will not make electrical contact with either the pins or the metal housing of the industry-standard USB plug. This is because extended cavity length L2 is dimensioned such that neither the pins nor the metal housing of the shorter industry-standard USB plug will reach extended socket pins 80 when the industry-standard USB plug is inserted into extended USB socket 130. However, industry-standard top socket pins 86 can still make electrical contact with the industry-standard USB plug pins when the industry-standard USB plug is inserted into extended USB socket 130. In this manner, backward compatibility is preserved.

Figure 4G:
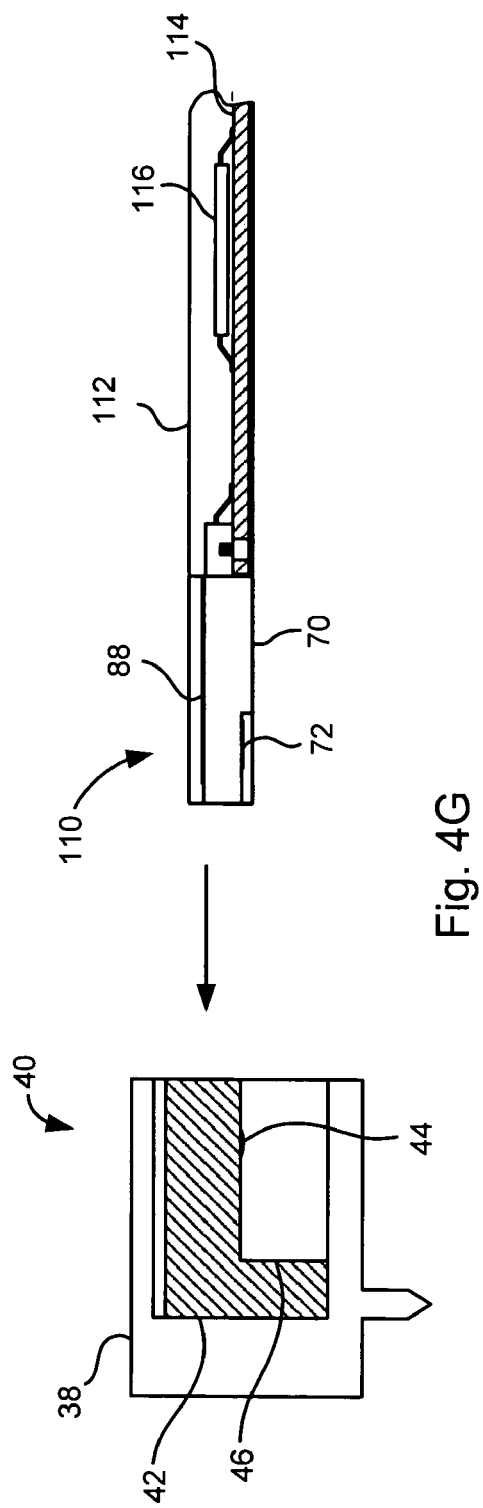
FIGS. 4G–4H show, in accordance with embodiments of the present invention, how the extended USB plug of FIG. 4A may be inserted into an industry-standard USB socket.
Figure 4H:
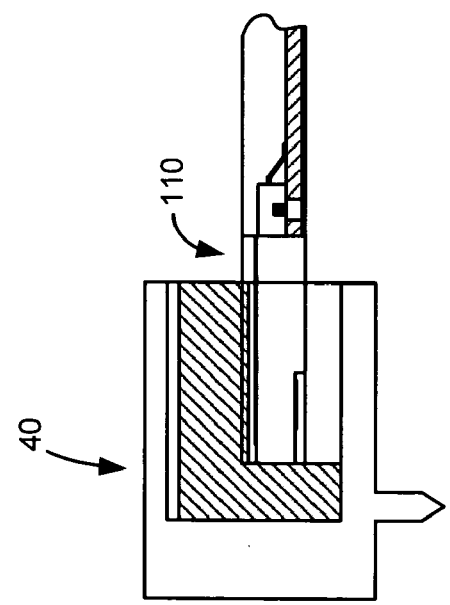

FIG. 4G shows the extended USB plug before and after insertion into an industry-standard USB socket 40. When fully inserted, the tip of pin substrate 70 is stopped by the back wall 46 of the industry-standard USB socket 40. On the upper surface of connector pin substrate 70, metal contact pins 88 make contact with the four industry-standard USB contact pins 44 of the industry-standard USB socket. Reverse-side metal contact pins 72 on the bottom surface of pin substrate 70 of extended USB plug 110 do not make contact with socket metal cover 38 of industry-standard socket 40 since reverse-side metal contact pins 72 are recessed into the bottom surface of connector pin substrate 70 or when insulating ribs are provided. Thus only the four standard USB pins (metal contact pins 44, 88) are electrically contacted. This is shown in FIG. 4H.

Figure 4I:
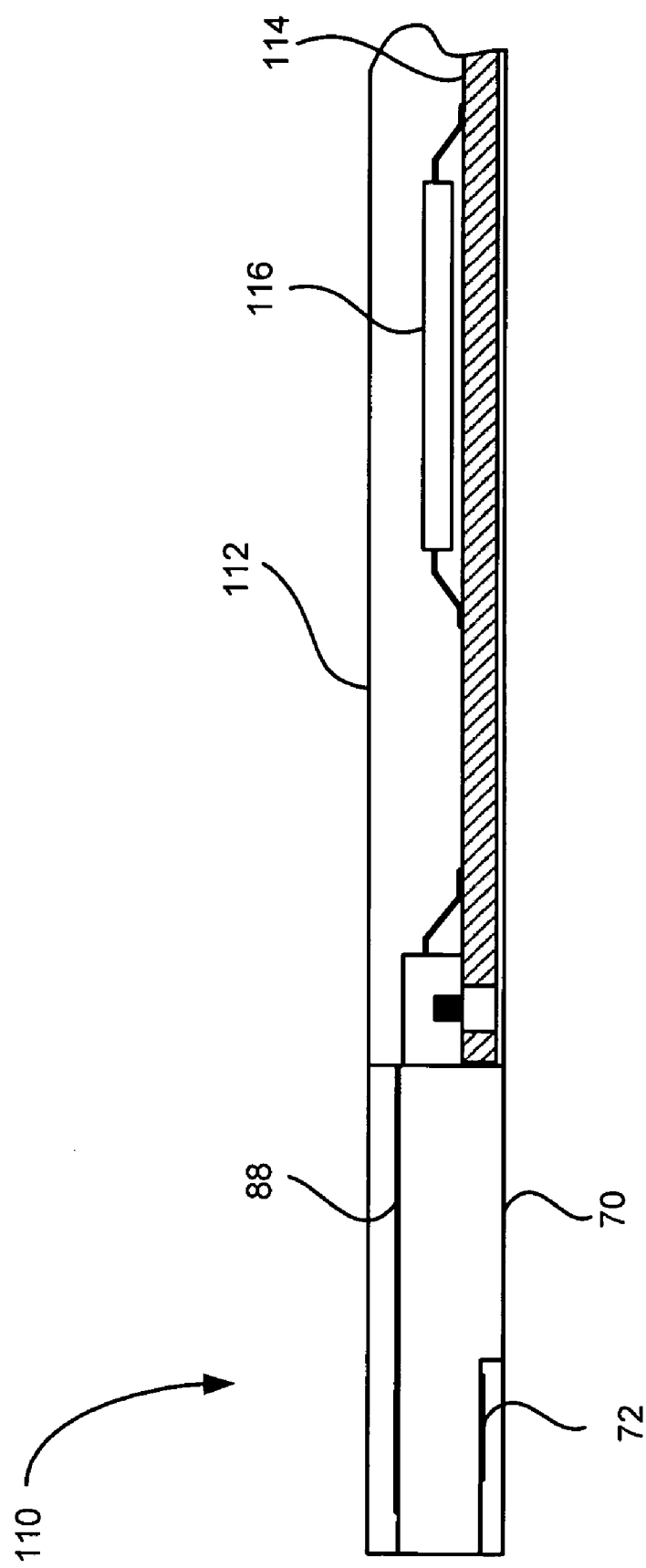
FIG. 4I shows, in accordance with an embodiment of the present invention, an extended-USB plug assembly, including a PCB board.
Figure 4J:
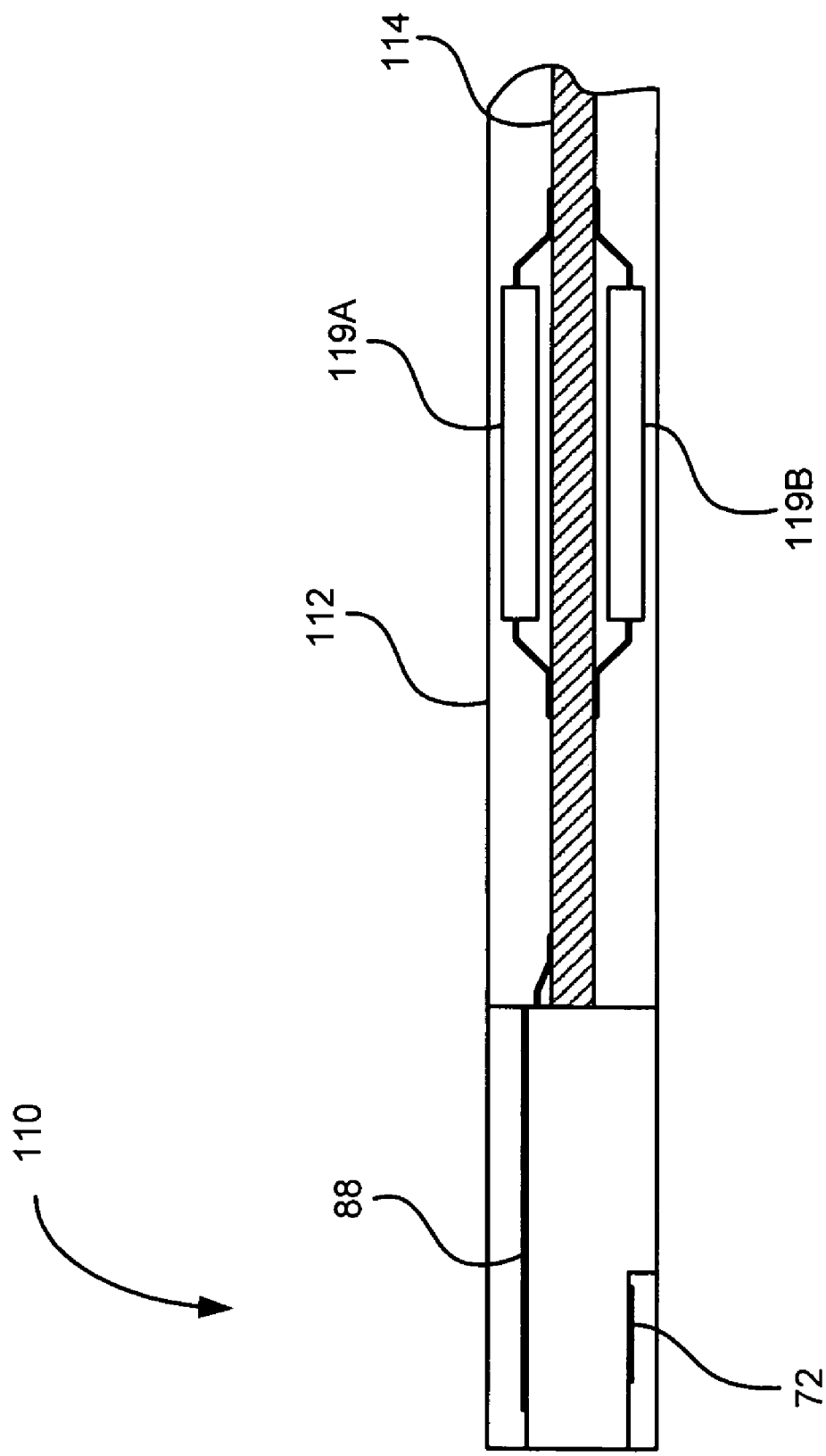
FIG. 4J shows, in accordance with another embodiment of the present invention, an extended-USB plug assembly, including a PCB board.

FIG. 4I shows an extended-USB plug assembly with PCB board 114 being unbalanced within housing 112 to accommodate thicker components thereon (such as chip 116). FIG. 4J shows an extended-USB plug assembly with PCB board 114 being balanced within housing 112 to accommodate components (such as components 119A and 119B on both sides of PCB board 114).

FIGS. 5A–E show a another embodiment of an extended USB plug having both the industry-standard USB metal contact pins and the extended pin on the top surface of the pin substrate. In top-view FIG. 5A, pin substrate 124 supports metal contact pins 120 and 122 on the top surface. In the example of FIG. 5A, metal contact pins 120 represents the industry-standard USB pins or pins configured to mate with industry-standard USB socket pins. Metal contact pins 122 represents the extended pins. Pin substrate 124 is an insulator such as ceramic, plastic, or other suitable insulating material. In an embodiment, metal leads or wires may pass through pin substrate 124 to connect metal contact pins 120 to wires inside the plastic housing that connects to the peripheral device.

Extended metal contact pins 122 are placed in a recess in the top side of pin substrate 124 near the tip 126 of the connector plug. In the example of FIGS. 5A–5E, 8 extended pins are provided to carry the extended signals (such as those associated with PCI-Express) although the number of extended pins may vary. The recess and metal contact pins 122 may be clearly seen in FIG. 5B, representing the view of the extended USB plug from the front. Tip 126 is shown in FIG. 5E, representing the view of the extended USB plug from the bottom. In FIG. 5E, the SMT pins 64 are also shown, along with guide pins 66 for positioning the extended USB plug on the peripheral's circuit board.

In the absence of the industry-standard USB plug metal housing, ribs 128 can be added alongside contact pins 122 to further prevent shorting of metal contact pins 122 against the metal housing of a USB socket. Extended metal contact pins 122 are additional pins for extended signals of non-USB protocols, such as for PCI-Express signals. Again, metal leads or wires can pass through pin substrate 124 (pin substrate 124 is seen in the side-view FIG. 5C) to connect extended metal contact pins 122 to wires inside the plastic housing that connects to the peripheral device. These wires are shown by reference number 134 in FIG. 5D, which represents the view of the extended USB plug from the rear.

Again, the length L3 of pin substrate 124 (see FIG. 5C) is longer than the length of the industry-standard USB pin substrate. The additional pin substrate length may be, for example, 2–5 millimeters. Extended metal contact pins 122 are located mostly in the extended pin substrate region beyond the length of the prior art pin substrate. As can be seen, the metal cover for the industry-standard USB plug is absent.

Figure 5F:
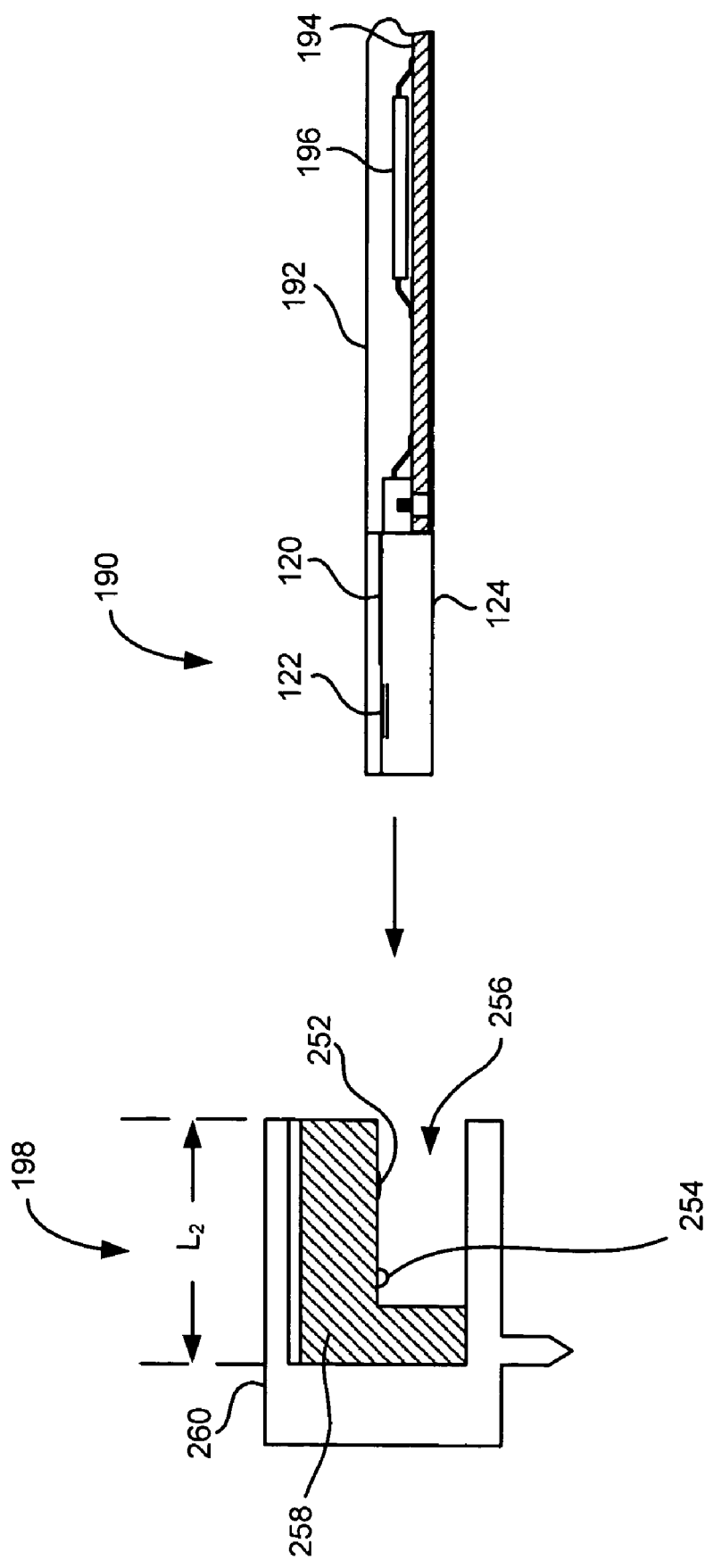
FIG. 5F shows, in accordance with an embodiment of the present invention, how the extended USB plug of FIG. 5A may be inserted into an extended USB socket.

FIG. 5F shows the extended USB plug 190 having pins 120 and extended pins 122. Extended USB plug 190 is shown coupled to a peripheral PCB board 194, on which chip 196 is mounted. A housing 192 is shown, representing the peripheral housing.

A side view of an extended USB socket 198 is also shown. Extended USB socket 198 has a cavity length L2 that is longer than the cavity length of the industry-standard USB socket. In addition to the industry-standard USB top socket pins 252, there are a plurality of extended socket pins 254 configured to make electrical contacts with extended plug pins 122 of extended USB plug 190 when extended USB plug 190 is inserted into extended USB socket 198. Extended socket pins 254 are formed in a curved shape (an example of which is shown in FIG. 5F but other shapes are possible) to provide a spring-like bias action against the extended pin of extended USB plug 190. The industry-standard USB top socket pins 252 make electrical contact with top plug pins 120 when the extended USB plug 190 is inserted into extended USB socket 198.

Note that when an industry-standard USB plug, such as that shown in FIG. 1A, is inserted into extended USB socket 198, the extended socket pins 254 disposed in the extended cavity 256 will not make electrical contact with either the pins or the metal housing of the industry-standard USB plug. This is because extended cavity length L2 is dimensioned such that neither the pins nor the metal housing of the shorter industry-standard USB plug will not reach extended socket pins 254 when the industry-standard USB plug is inserted into extended USB socket 198. However, industry-standard top socket pins 252 can still make electrical contacts with the industry-standard USB plug pins when the industry-standard USB plug is inserted into extended USB socket 198. In this manner, backward compatibility is preserved.

FIG. 5G shows the extended USB plug 190 before and after insertion into an industry-standard USB socket 40. When fully inserted, the tip of pin substrate 124 is stopped by the back wall 46 of the industry-standard USB socket 40. On the upper surface of connector pin substrate 124, metal contact pins 120 make contact with the four industry-standard USB contact pins 44 of the industry-standard USB socket. Extended metal contact pins 122 on the top surface of pin substrate 124 of extended USB plug 190 do not make contact with socket metal cover 38 of industry-standard socket 40 since extended metal contact pins 122 are recessed into the top surface of connector pin substrate 124 or when insulating ribs are provided. Thus only the four standard USB pins (metal contact pins 120, 44) are electrically contacted. This is shown in FIG. 5H.

Figure 5I:
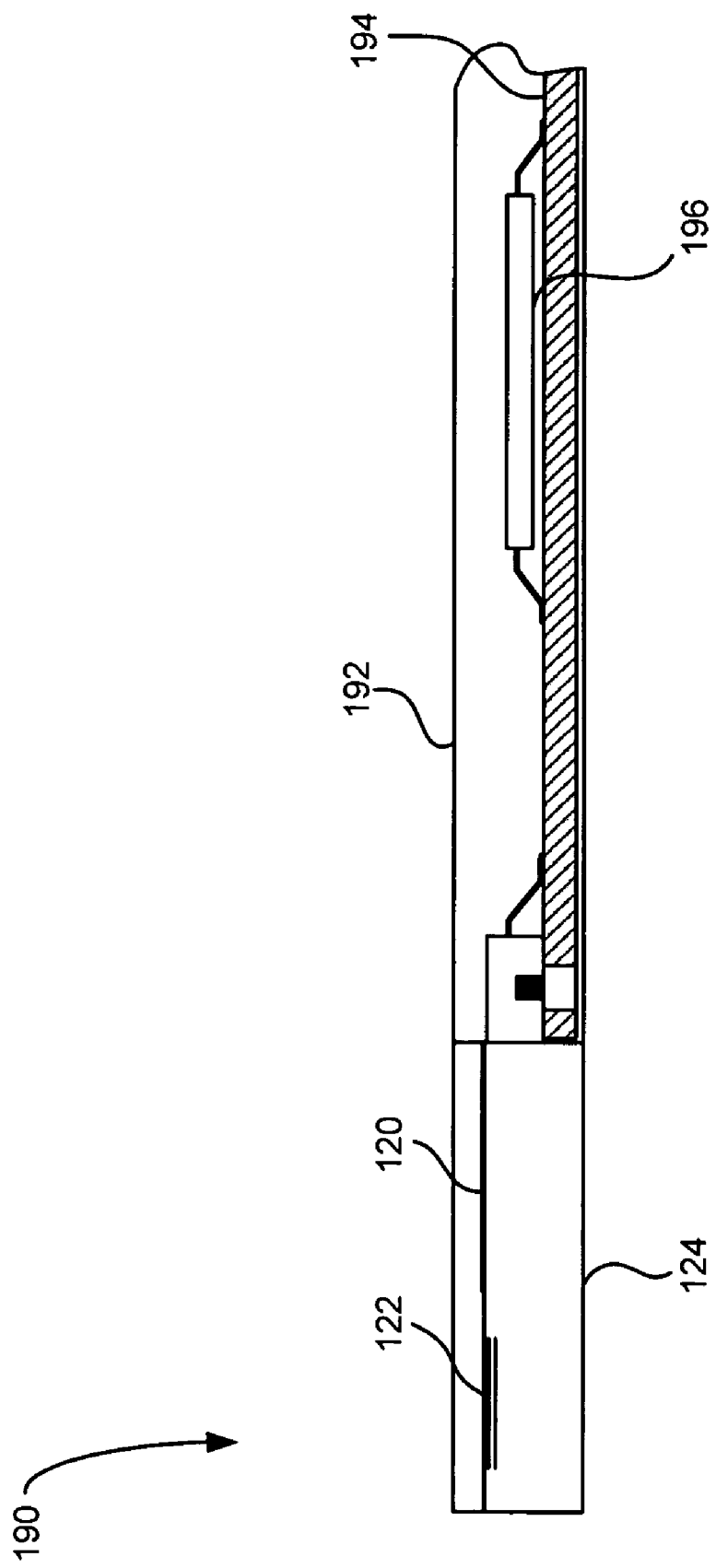
FIG. 5I shows, in accordance with an embodiment of the present invention, an extended-USB plug assembly, including a PCB board.
Figure 5J:
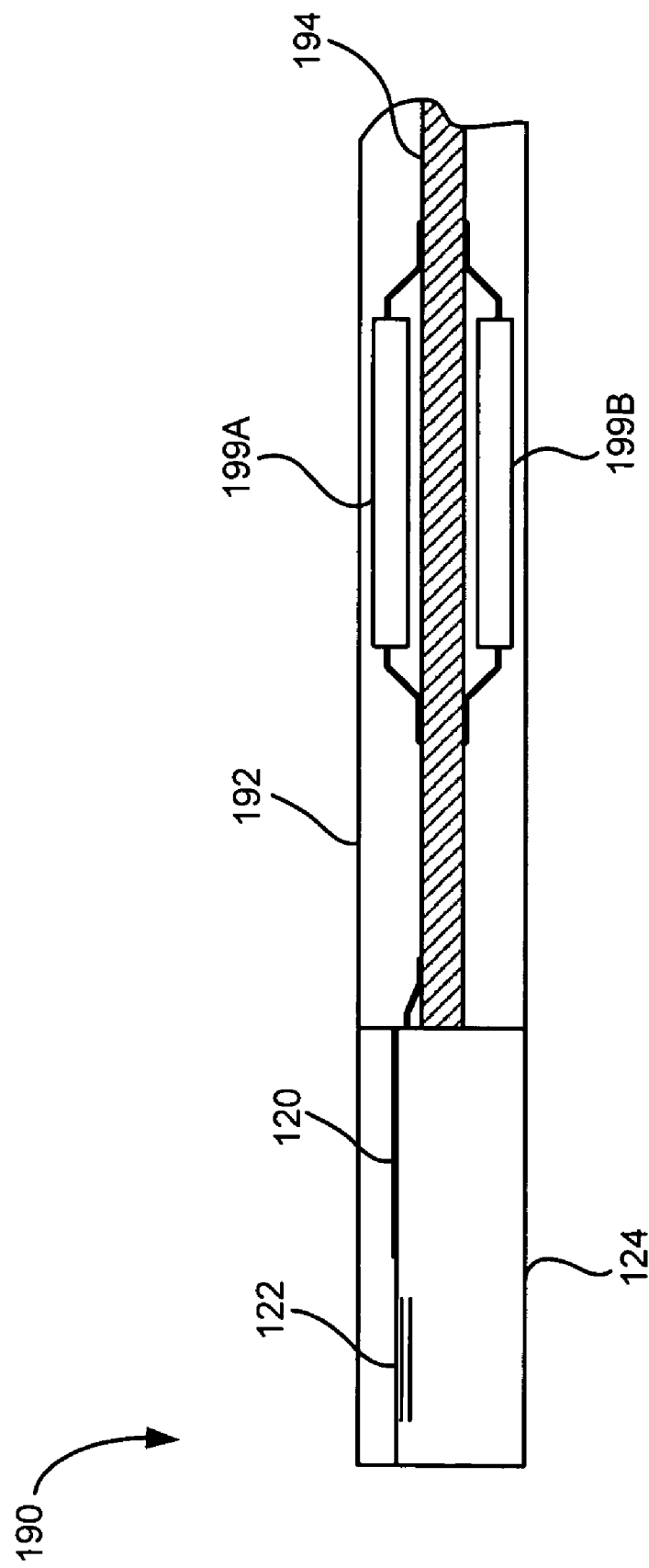
FIG. 5J shows, in accordance with another embodiment of the present invention, an extended-USB plug assembly, including a PCB board.

FIG. 5I shows an extended-USB plug assembly with extended USB plug 190 connected to PCB board 194. PCB board 194 is unbalanced within housing 192 to accommodate thicker components thereon (such as chip 196). FIG. 5J shows an extended-USB plug assembly with PCB board 194 being balanced within housing 192 to accommodate components (such as components 199A and 199B on both sides of PCB board 194).

One reason for employing a reduced size extended USB plug is the ability to use multiple of such plugs in adjacent extended USB sockets and/or industry-standard USB sockets. Due to the fact that the industry-standard metal cover is no longer employed, the resultant extended USB plug can be made thinner. As a result, the sockets can be placed adjacent to one another or placed much closer together (in a row, a column, or in a matrix of sockets), and multiple of the thinner extended USB plugs can be employed without physically interfering with one another.

Figure 6A:
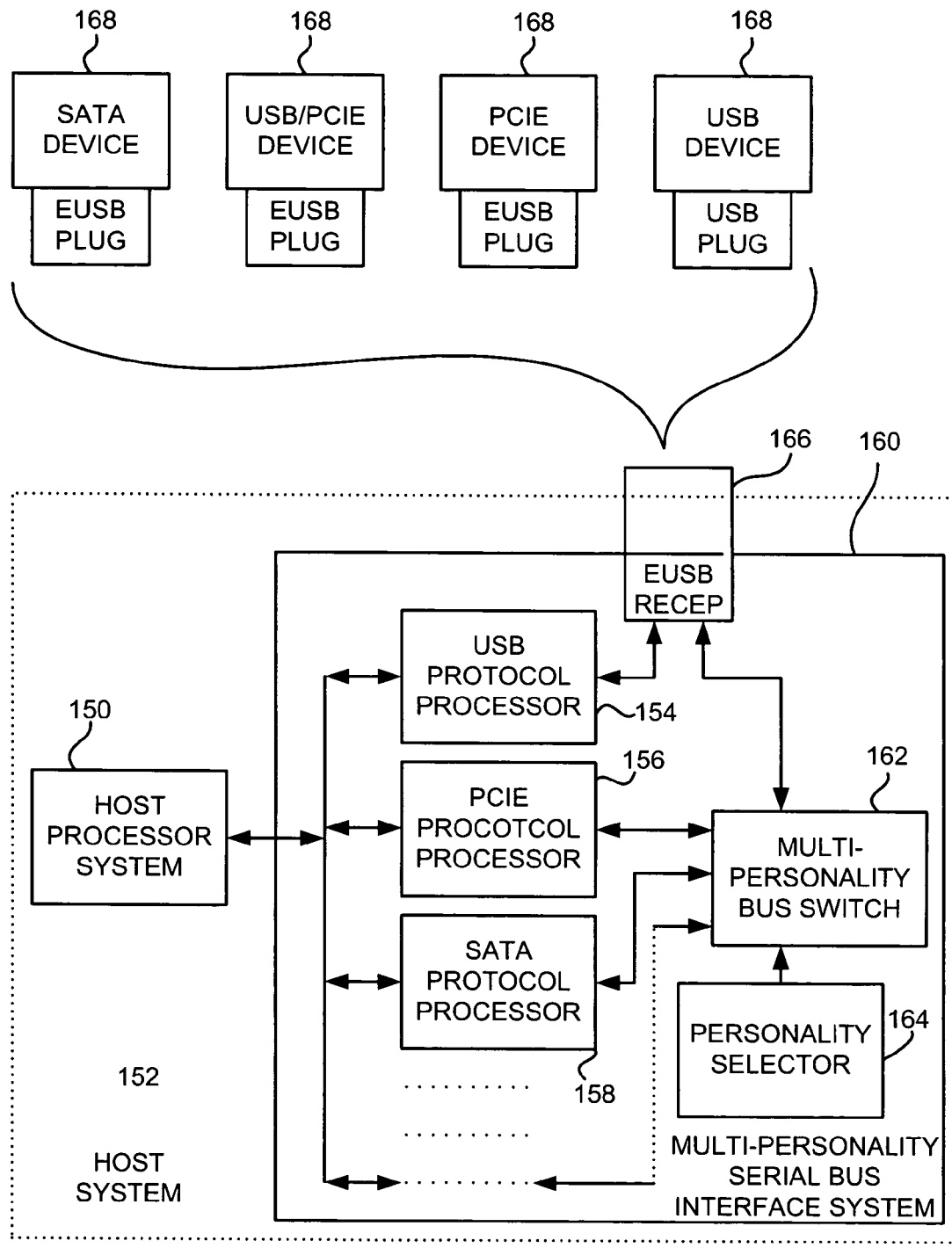
FIG. 6A shows, in accordance with an embodiment of the present invention, a block diagram of a host with an extended-USB socket that supports extended-mode communication.

FIG. 6A shows, in accordance with an embodiment of the present invention, a block diagram of a host with an extended-USB socket that supports extended-mode communication. A variety of extended-USB or USB peripherals 168 may be plugged into extended-USB socket 166 of host 152. For example, a SATA peripheral, a PCI-Express peripheral, a Firewire IEEE 1394 peripheral, a Serial-Attached SCSI peripheral, or an USB-only peripheral could be inserted. Each can operate in its own standard mode.

Host 152 has processor system 150 for executing programs including USB-management and bus-scheduling programs. Multi-personality serial-bus interface 160 processes data from processor system 150 using various protocols. USB processor 154 processes data using the USB protocol, and inputs and outputs USB data on the USB differential data lines in extended USB socket 166.

The extended metal contact pins in extended USB socket 166 connect to multi-personality bus switch 162. Transceivers in multi-personality bus switch 162 buffer data to and from the transmit and receive pairs of differential data lines in the extended metal contacts for extended protocols such as PCI-Express, Firewire IEEE 1394, Serial-Attached SCSI, and SATA. When an initialization routine executed by processor system 150 determines that inserted peripheral 168 supports SATA, personality selector 164 configures multi-personality bus switch 162 to connect extended USB socket 166 to SATA processor 158. When the initialization routine executed by processor system 150 determines that inserted peripheral 168 supports PCI-Express, personality selector 164 configures multi-personality bus switch 162 to connect extended USB socket 166 to PCI-Express processor 156. Then processor system 150 communicates with either PCI-Express processor 156 or SATA processor 158 instead of USB processor 154 when extended mode is activated.

Figure 6B:
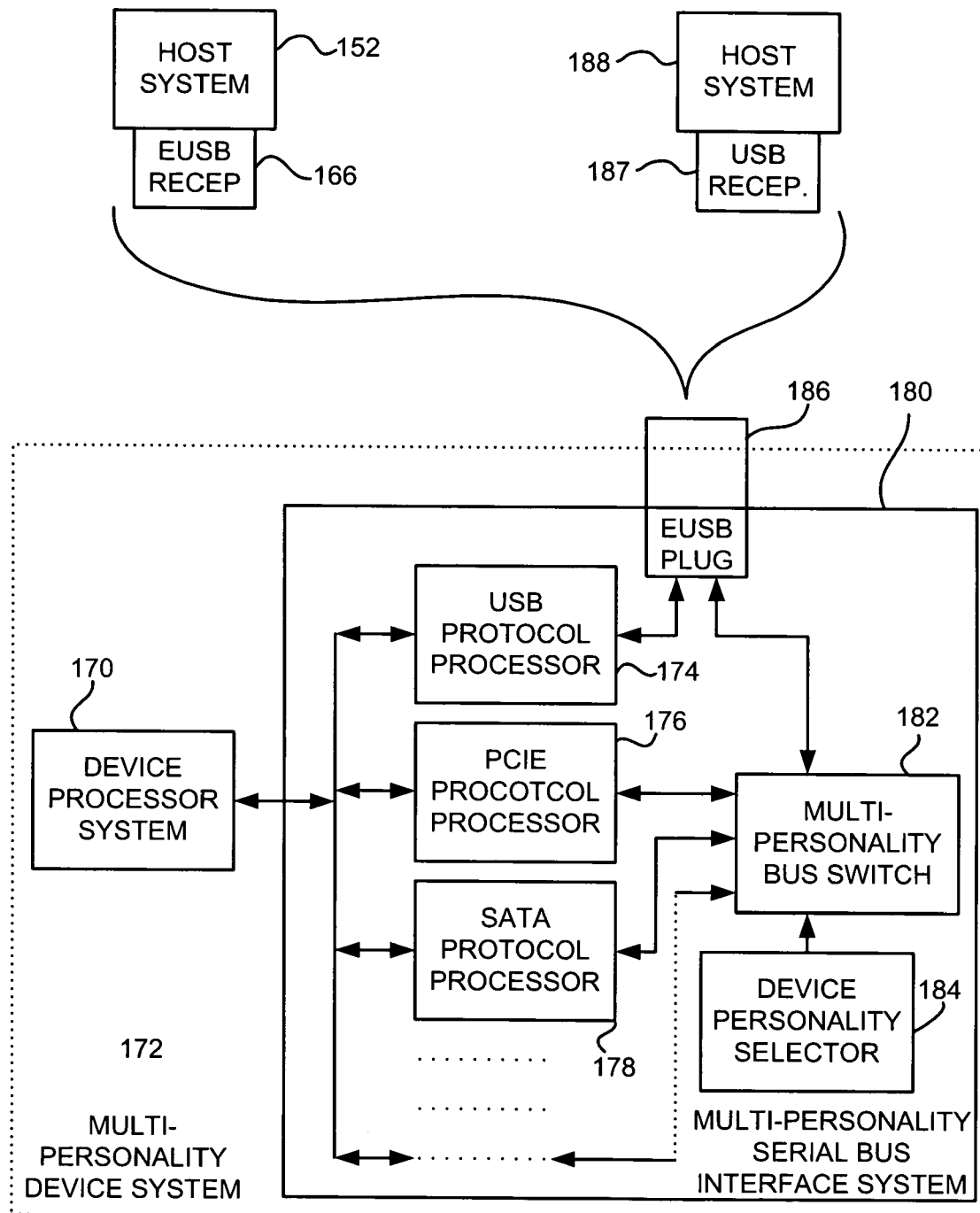
FIG. 6B shows, in accordance with an embodiment of the present invention, a block diagram of a peripheral with an extended-USB connector that supports extended-mode communication.

FIG. 6B shows, in accordance with an embodiment of the present invention, a block diagram of a peripheral with an extended-USB connector that supports extended-mode communication. Multi-personality peripheral 172 has extended USB connector 186 that could be plugged into extended-USB socket 166 of host 152 that has extended-mode communication capabilities such as SATA, 1394, SA-SCSI, or PCI-Express. Alternately, extended USB connector 186 of multi-personality peripheral 172 could be plugged into standard-USB socket 187 of host 188 that only supports standard USB communication.

Multi-personality peripheral 172 has processor system 170 for executing control programs including USB-peripheral-control and response programs. Multi-personality serial-bus interface 180 processes data from processor system 170 using various protocols. USB processor 174 processes data using the USB protocol, and inputs and outputs USB data on the USB differential data lines in extended USB connector 186.

The extended metal contact pins in extended USB connector 186 connect to multi-personality bus switch 182. Transceivers in multi-personality bus switch 182 buffer data to and from the transmit and receive pairs of differential data lines in the extended metal contacts for extended protocols such as PCI-Express, 1394, SA SCSI (also referred to herein as SAS), and SATA. When a control or configuration routine executed by processor system 170 determines that host 152 has configured multi-personality peripheral 172 for SATA, personality selector 184 configures multi-personality bus switch 182 to connect extended USB connector 186 to SATA processor 178. When the initialization routine executed by processor system 170 determines that inserted peripheral 188 supports PCI-Express, personality selector 184 configures multi-personality bus switch 182 to connect extended USB connector 186 to PCI-Express processor 176. Then processor system 170 communicates with either PCI-Express processor 176 or SATA processor 178 instead of USB processor 174 when extended mode is activated.

If a PCI Express device with an extended USB plug is plugged into a host system with a conventional USB receptacle, nothing will be recognized if the PCI Express device does not support USB. The host system will not see anything that has plugged into the system. The same is true for a SATA-only device, etc.

FIG. 7 is a table of extended and standard pins in the extended USB connector and socket. For USB, the A side of the pin substrates contains the four standard USB signals, which include a 5-volt power signal and ground. The differential USB data D−, D+ are carried on pins 2 and 3. For PCI Express, pins 2 and 3 are used for REFCLK− and REFCLK+.

Side B of the pin substrates, or the extension of the primary surfaces, carries the extended signals. Pin 1 is a 3.3-volt power signal for PCI-Express, Serial-ATA, and IEEE1394, while pin 2 is a 1.5-volt supply for PCI-Express and reserved for others. Pin 8 is a 12-volt power supply for SATA, and IEEE1394 and reserved for PCI-Express. Pin 5 is a ground.

Pins 3 and 4 carry a transmit differential pair, called PETn, PETp, for PCI-Express, T−, T+ for SATA. They also carry the B differential pair, TPB*, TPB, for IEEE 1394. Pins 6 and 7 carry a receive differential pair, called PERn, PERp, for PCI-Express, R−, R+ for SATA. They also carry the A differential pair, TPA*, TPA, for IEEE 1394.

The ExpressCard pins CPPE#, CPUSB#, CLKREQ#, PERST#, and WAKE# are not used in the extended USB connector to reduce the pin count. Additional pins could be added to the extended USB connector and socket if some or all of these pins are desired.

Note that the Multi-Personality Bus Switch (and the Personality Selector) may not be needed in a lot of situations. For example, if only USB and SATA exist, since they do not conflict with each other, no bus switch is required (but may be provided if desired). Similarly, for USB and 1394, no bus switch is required. For PCI Express and USB, since REFCLK− and REFCLK+ are not mandatory, these 2 signals can be swapped with USB D− and D+. In this scenario, no bus switch is necessary as well.

Figure 8:
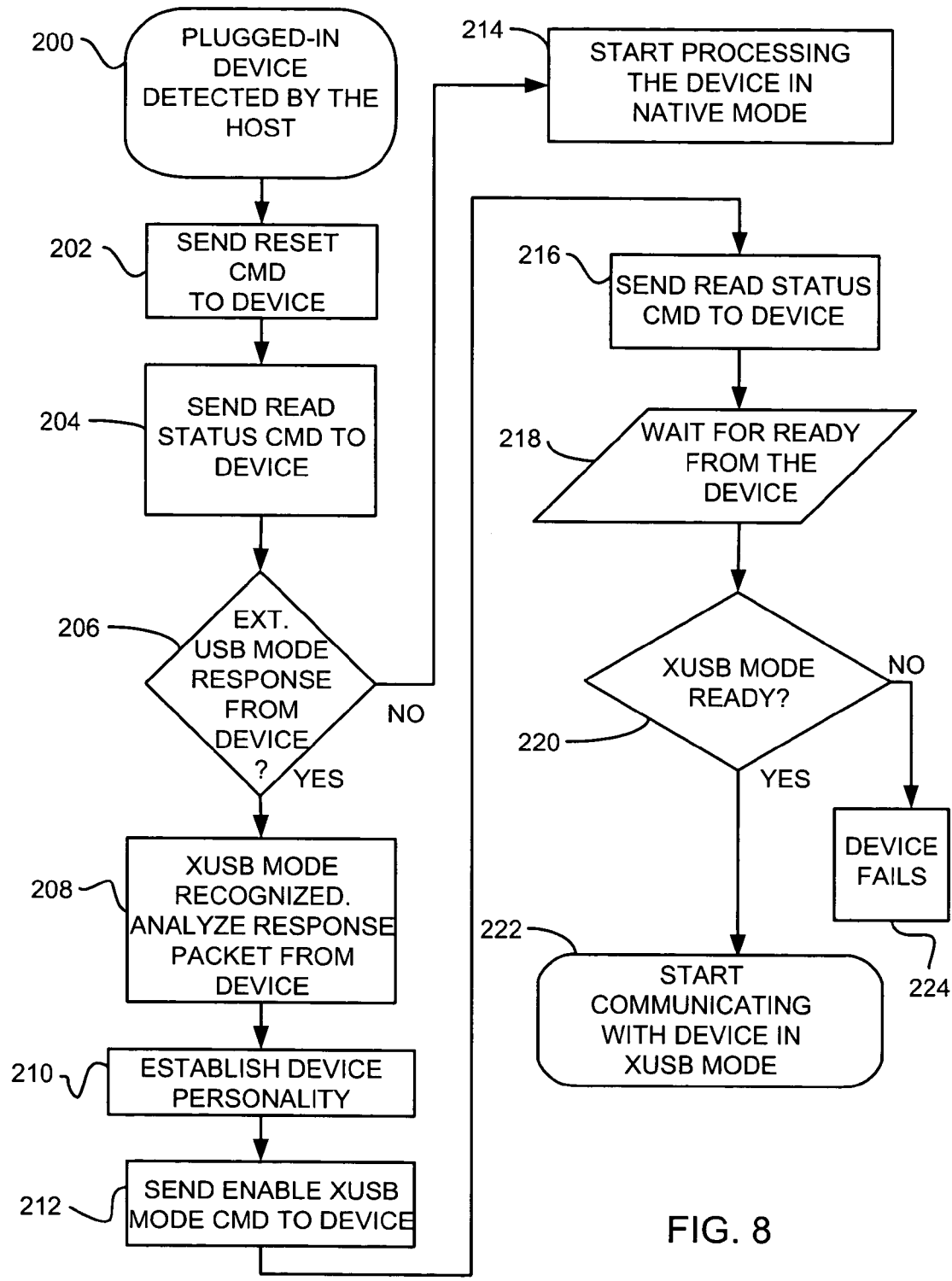
FIG. 8 shows, in accordance with an embodiment of the present invention, a flowchart of an initialization routine executed by a host for detecting a device plugged into an extended USB socket.

FIG. 8 shows, in accordance with an embodiment of the present invention, a flowchart of an initialization routine executed by a host for detecting a device plugged into an extended USB socket. A host such as a PC can have an extended USB socket. Either an extended USB device, or a standard USB device can be plugged into the extended USB socket. Note that the steps of FIG. 8 are only exemplary to detect whether the inserted device supports extended-USB mode or only standard USB mode. Accordingly, some of these steps may be omitted or substituted by other steps. The routine may be executed by processor system 150 of FIG. 6A.

The host detects a newly inserted device plugged into the extended USB socket, step 200, such as by detecting resistance changes on the metal contact pins of the extended USB socket. When the newly inserted device is detected, a USB reset command is sent over the USB differential signal lines to the device, step 202. The sending of the reset command may be unnecessary if there is another facility for reset (e.g., a hardware reset). A USB read-status command (or another command) is then sent by the host, step 204.

The peripheral device responds by sending its status information using USB protocols. The host examines this status information, and in particular looks for a mode identifier indicating that the peripheral supports extended-USB mode. This mode identifier can be a status bit or a unique code in an area reserved for use by the peripheral vendor to identify the peripheral's type or capabilities.

When the peripheral responds with a status indicating no extended-USB support, step 206, then processing continues in native USB mode, step 214. Standard USB transactions are performed between the host and the peripheral using the differential USB data pins in the four-pin side of the extended USB socket. The peripheral likely has a standard USB connector that has only 4 metal contact pins, not the extension with the 8 additional metal contact pins.

When the peripheral responds with a status indicating extended-USB support, step 206, then the host further examines the packet from the peripheral to determine that the peripheral can support higher-speed communication using the extended metal contact pins, step 208. The peripheral has an extended USB connector with the 8 additional metal contact pins in an extension portion of the connector.

The host can further examine the capabilities of the peripheral, such as to determine which extended modes are supported, step 210. The device can respond with information regarding a single extended mode protocol or may respond with information regarding a plurality of the extended protocols that it supports. Some peripherals may support PCI-Express communication in extended mode, while others support Serial-ATA, Serial Attached SCSI, or IEEE 1394 as the extended-mode protocol.

The host then sends a vendor-defined USB OUT command to the peripheral, step 212. This command instructs the peripheral to activate its extended mode of operation. The host verifies that the device received the command by reading its status again, step 216. The peripheral responds with a ready status, step 218. If the status read back from the device does not indicate that the peripheral is ready to switch to extended mode within a reasonable amount of time, step 220, then the device fails, step 224. The host could fall back on standard USB mode, step 214, or attempt again to activate extended mode, step 202. After trying a predetermined number of times, the host falls back on standard USB mode, step 214.

When the peripheral responds with the correct ready, step 220, then the host and peripheral can begin communicating in the extended mode. The 8 additional metal contact pins in the extended portion of the USB connector and socket are used for communication rather than the 4 USB metal contact pins. For example, the PCI-Express transmit and receive differential pairs can be used to bi-directionally send and receive data when the device has a PCI-Express personality. The host uses these extended pins to send a read-status command to the peripheral, step 222. Data can be sent and received at the higher rates supported by PCI-Express rather than the slower USB rates.

Figure 9:
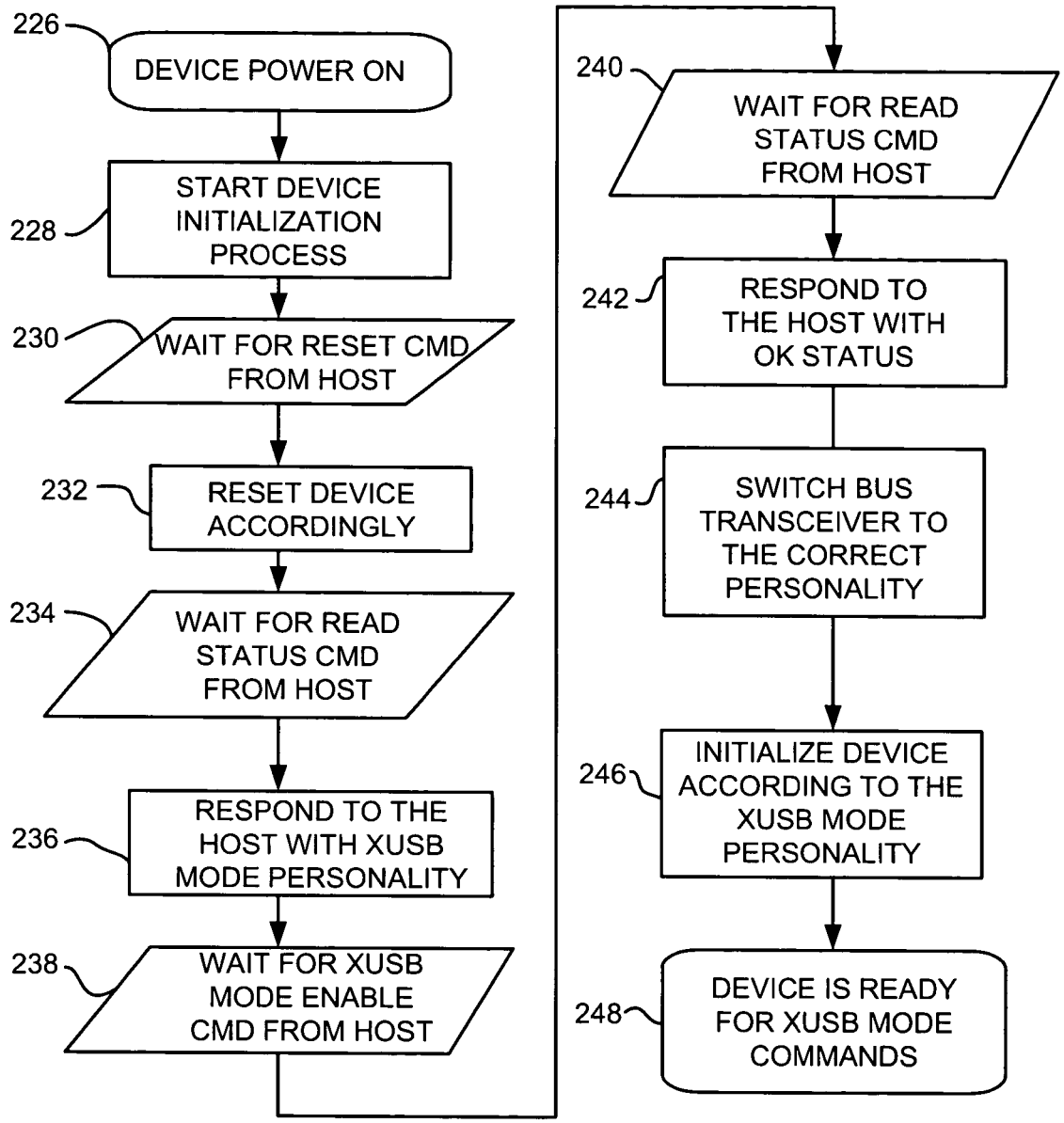
FIG. 9 shows, in accordance with an embodiment of the present invention, a flowchart of an initialization routine executed by a peripheral device plugged into an extended USB socket.

FIG. 9 shows, in accordance with an embodiment of the present invention, a flowchart of an initialization routine executed by a peripheral device plugged into an extended USB socket. A peripheral can have an extended USB connector that can be plugged into either an extended USB socket or a standard USB socket. This routine executes on the peripheral device and helps the host detect that the inserted device supports extended-USB mode. The routine may be executed by peripheral-device processor system 170 of FIG. 6B.

When the peripheral device is plugged into the USB socket, power is received though the power and ground pins on the 4-pin USB portion of the connector, step 226. The peripheral device executes any initialization procedures to power itself up, step 228, and waits for a reset command from the host, step 230. Once the reset command is received from the host, the peripheral device resets itself, step 232. The sending of the reset signal is optional (e.g., in the case where there exists a hardware reset mechanism).

The peripheral device waits for further commands from the host, step 234, such as a read-status command (or another command sent by the host). The status read by the host, or further data read by the host can contain capability information about the peripheral device, such as which extended modes are supported, PCI-Express, SATA, IEEE 1394, SA SCSI, etc., step 236. The device can respond with information regarding a single extended mode protocol or may respond with information regarding a plurality of the extended protocols that it supports. The reset and read-status commands are standard USB commands from the host, although, as mentioned, these are not absolutely necessary and may be omitted and/or substituted.

The peripheral device then waits for a command from the host to enable extended-mode communication, step 238. An enable command followed by another read-status command must be received, so the peripheral waits for the read-status command, step 240. Once the read-status command is received, the peripheral responds with an OK or READY status to indicate that it is ready to switch to using the extended metal contact pins on the connector, step 242.

Then the peripheral device switches its bus transceivers to match the bus-protocol specified by the host to be able to communicate over the extension metal contact pins, step 244. The 4 USB metal contact pins are not used. The peripheral device waits for a read-status command sent by the host over the extended metal contact pins and responds to this read-status command, step 246, initializing for the new protocol mode. The peripheral device can then receive extended commands such as PCI-Express commands that are received over the extended metal contact pins on the extended portion of the connector, such as the PCI-Express transmit and receive differential lines, step 248.

For single mode, the USB pins can be removed. For example, pins 88 in FIG. 4A and pins 120 in FIG. 5A can all be removed. They do not have to be removed though because if no trace is connected to them, these pins will not do any harm.

Figure 10:
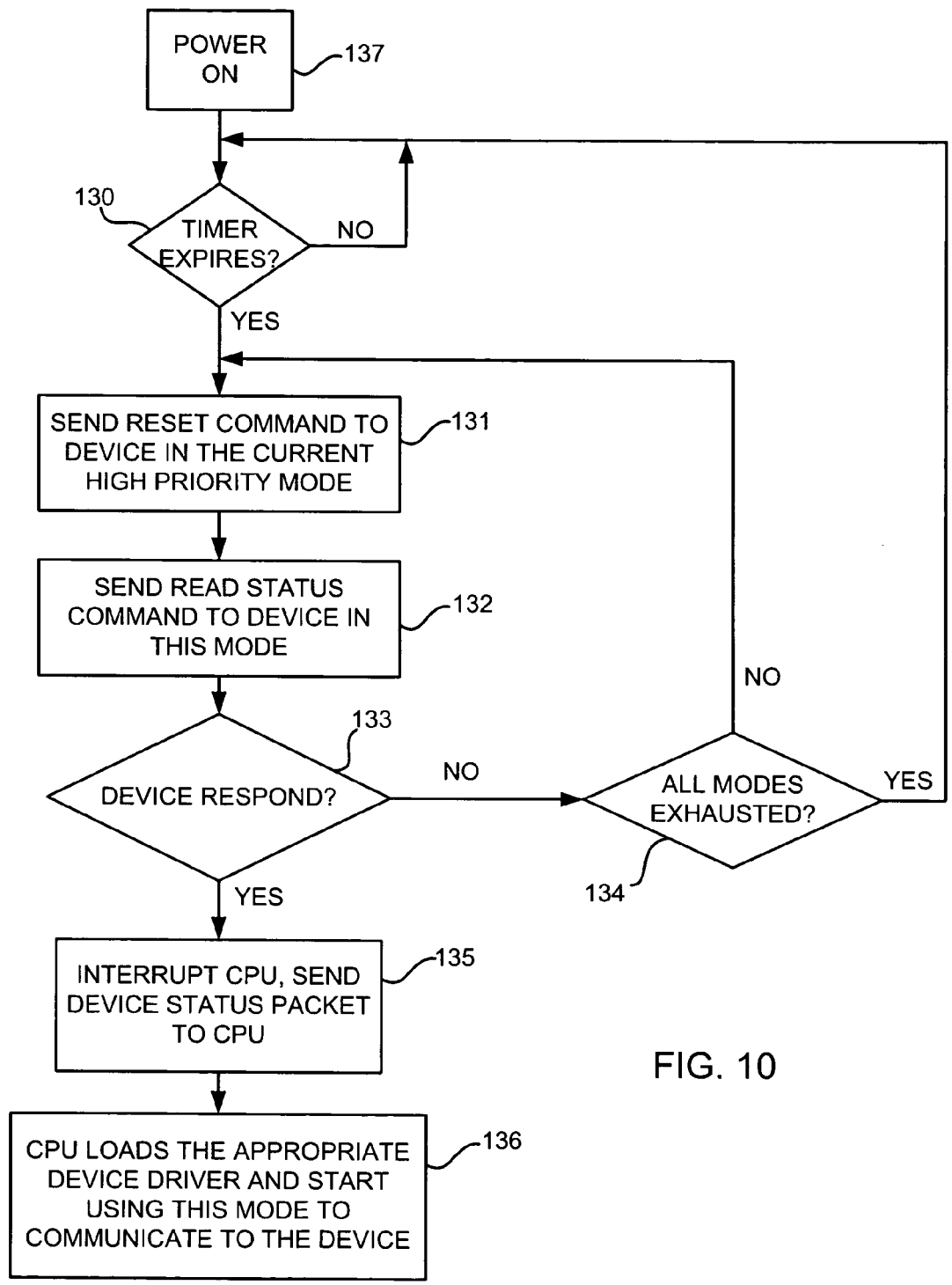
FIG. 10 shows, in accordance with an embodiment of the present invention, an exemplary flowchart of an initialization routine executed by a single or 1 side multi mode host for detecting a device plugged into an extended USB socket.

FIG. 10 shows, in accordance with an embodiment of the present invention, an exemplary flowchart of an initialization routine executed by a single or 1 side multi mode host for detecting a device plugged into an extended USB socket. Note that the steps of FIG. 10 is only exemplary to ascertain which mode should be used for communication between the host and the device and some of these steps may be omitted or substituted by other steps. In the context of the present invention, single mode means only 1 mode, except the conventional USB mode. 1 side multi mode means that in the extended connectors 72 in 4A, there are multiple modes supported. A host such as a PC can have an extended USB socket. Either an extended USB device, or a single mode device can be plugged into the extended USB socket. Connectors 88 in FIG. 4A can be saved. If connectors 88 exist, then they are not connected to anything. The routine may be executed by a dedicated state machine or a microcontroller (not shown in FIG. 6A).

An optional timer is implemented in firmware or hardware. When the timer expires 130, this routine is executed. Note that the execution of the routine may be triggered by another method instead of using the timer (such as manually). It sends a reset command to the extended USB connectors (which may or may not have a device plugged in) in the current highest priority mode 131. The sending of the reset command is optional (e.g., in the case where there exists a facility to perform hardware resets). Then it sends read status command (or another command that can elicit a response from the device) to the connectors 132. If the device does not exist or does not respond, step 133, it will figure out if all of its modes are exhausted or not, step 134. If they are not exhausted, then it will send the reset command with the next priority mode 131, etc. If they are exhausted, then it jumps to restart the timer again and wait for the timer to expire 130.

If the device respond, that means the device can talk in the current mode. The microcontroller will interrupt the CPU and send the device status packet back to CPU 135. The host CPU will load the appropriate device driver and start using this mode to communicate to the device directly.

Note that although FIG. 10 is discussed in the context of using a CPU, hardwired logic may be employed in the alternative. When communicating with the device, a device driver may be provided. In the absence of a device driver, the steps can be executed from the BIOS or within the operating system of the host.

Figure 11:
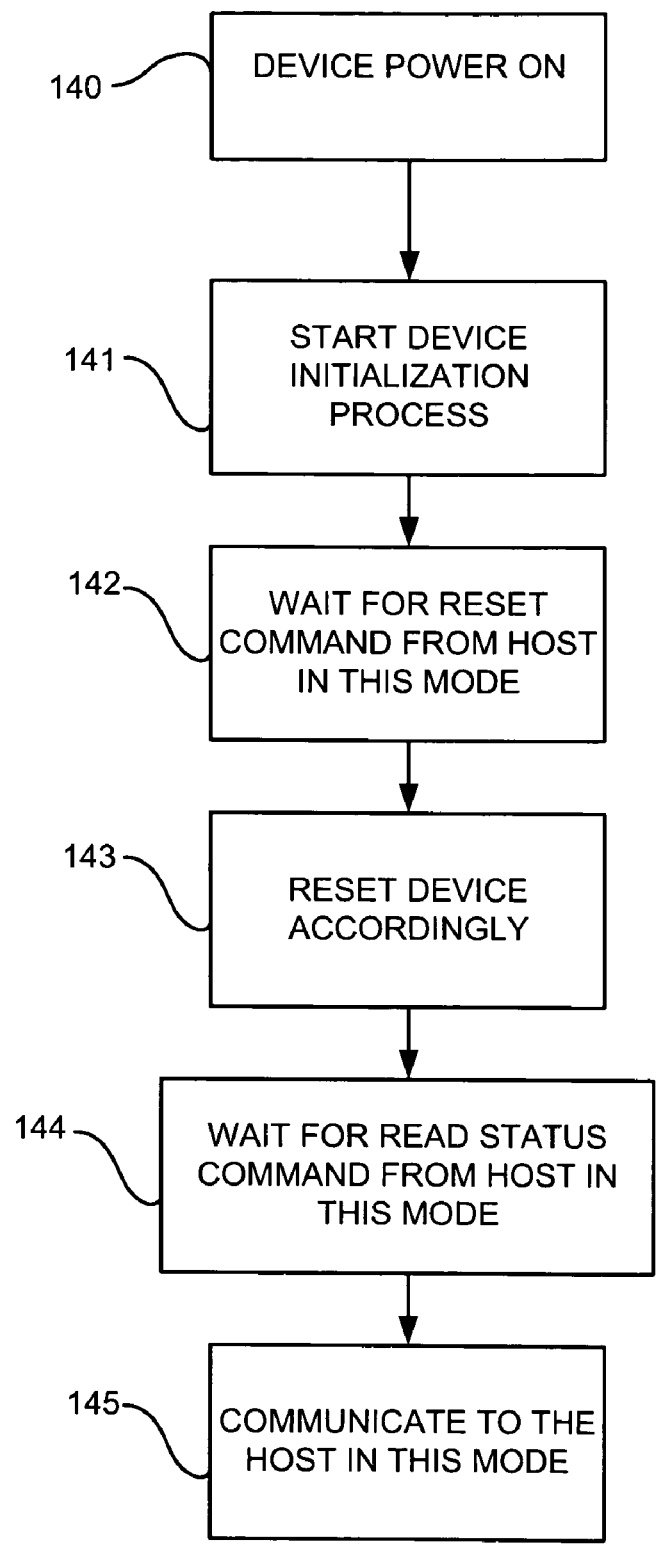
FIG. 11 is a flowchart of an initialization routine executed by a single mode peripheral device plugged into an extended USB socket.

FIG. 11 is a flowchart of an initialization routine executed by a single mode peripheral device plugged into an extended USB socket. Note that the steps of FIG. 11 is only exemplary to ascertain which mode should be used for communication between the host and the device and some of these steps may be omitted or substituted by other steps. A peripheral can have an extended USB connector that can be plugged into an extended USB socket. This routine executes on the peripheral device. The routine may be executed by peripheral-device processor system 170 of FIG. 6B.

When the peripheral device is plugged into the USB socket, power is received though the power and ground pins on the 8-pin extended portion of the connector, step 140. The peripheral device executes any initialization procedures to power itself up, step 141, and waits for a reset command from the host, step 142. Once the reset command is received from the host, the peripheral device resets itself, step 143. The receiving of the reset command is optional (such as in the case where hardware reset exists).

The peripheral device waits for further commands from the host, step 144, such as a read-status command (or another command from the host). The device will respond to this command using its only mode 145.

Several other embodiments are contemplated by the inventors. For example, a variety of materials may be used for the connector substrate, circuit boards, metal contacts, metal case, etc. Plastic cases can have a variety of shapes and may partially or fully cover different parts of the circuit board and connector, and can form part of the connector itself. Various shapes and cutouts can be substituted. Pins can refer to flat metal leads or other contactor shapes rather than pointed spikes. The metal cover can have the clips and slots that match prior-art USB connectors.

ExpressCard can use the same mechanism described above to include SATA, SAS and 1394. They can be overlapped with the PCI Express signals.

Rather than use PCI-Express, the extended USB connector/socket can use serial ATA, Serial Attached SCSI, or Firewire IEEE 1394 as the second interface. The host may support various serial-bus interfaces as the standard interface, and can first test for USB operation, then IEEE 1394, then SATA, then SA SCSI, etc, and later switch to a higher-speed interface such as PCI-Express. During extended mode when the extended contacts are being used for the extended protocol, the 4 USB contacts can still be used for USB communication. In this case, there are two communication protocols that the host can use simultaneously.

In the examples, USB series A plugs and receptacles are shown. However, the invention is not limited to Series A. Series B, Series mini-B, or Series mini-AB can be substituted. Series B uses both upper and lower sides of the pin substrate for the USB signals. The left-side and right-side of the pin substrate can be used for the additional extended pins. Series mini-B and Series mini-AB use the top side of the pin substrate for the USB signals. The additional extended pins can be placed on the bottom side of the pin substrate 34 for these types of connectors. The extended USB connector, socket, or plug can be considered an extended very-high-speed USB connector or EUSB connector since the higher data-rates of PCI-Express or other fast-bus protocols are supported with a USB connector.

A special LED can be designed to inform the user which electrical interface is currently in use. For example, if the standard USB interface is in use, then this LED can be turned on. Otherwise, this LED is off. If more than 2 modes exists, then a multi-color LED can be used to specify the mode, such as green for PCI-Express and yellow for standard USB.

Figure 13:
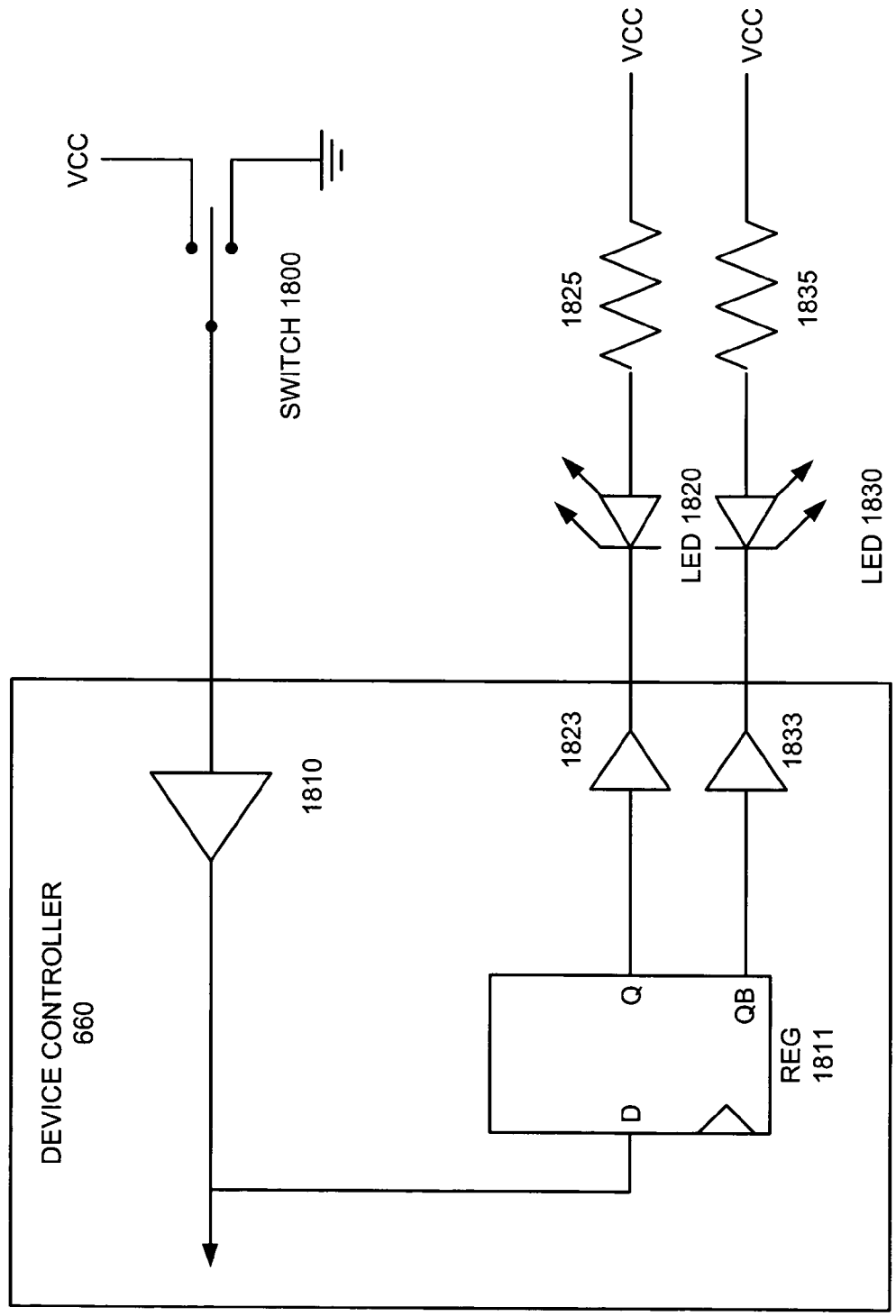

For example, if a device such as an Express Card can communicate using either the USB or PCI Express mode, a hardware switch may be employed to select the mode, and an LED Logic circuit may indicate the communication mode to the user. FIG. 13 shows one such implementation. The basic LED circuit includes a photo LED, current limiting resistor and a buffer within the controller. The LED will be on whenever there is a current flowing across it from the cathode to anode. The detect and LED buffer may be implemented with general purpose input/output (GPIO) port, for example.

In FIG. 13, the USB mode is selected with SW1800 switched to VCC; whereas PCI Express mode is selected with SW1800 switched to ground. The selected mode is then stored to configuration register REG1 via the detect circuit. As shown, there are two LEDs for mode indication, i.e. LED 1830 will be turned on when USB mode is selected. Otherwise, LED 1820 will be on for PCI Express mode.

Alternatively, hardware strapping may be employed to indicate the communication mode of such multi-protocol capable device. FIG. 14 shows one implementation of hardware strapping. As a further alternative, the mode of protocol may be directly programmed into configuration without the need for hardware switch. During the device configuration stage, the software may store the mode setting from auto mode detection (if the device has an intelligent algorithm to determine the proper mode) or may download the mode setting from a non-volatile storage device, for example. As a further alternative, the LED circuit portion of FIG. 13 may be implemented by the LED circuit of FIG. 15 wherein the device controller sources current into the LED when the buffer output is driven high.

Figure 16:
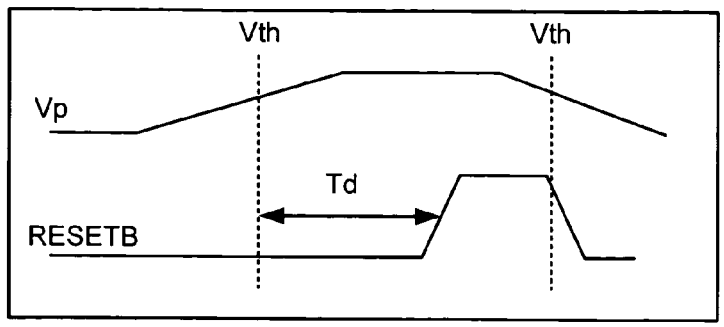
FIGS. 16 and 18 show, in accordance with embodiments of the present invention, various reset generation arrangements.
Figure 17:
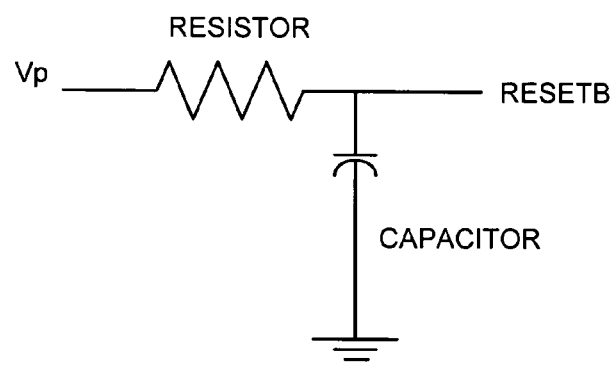
Figure 18:
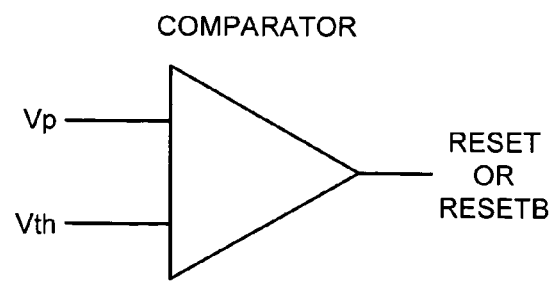

There are times when it may be desirable to generate a clean reset signal for the peripheral device. For example, if the power supply voltage drops below a threshold voltage, it may be desirable to assert a reset signal and keep the reset signal asserted for some time interval (Td) after the power supply voltage rises above the threshold voltage to give the multi-personality device time to stabilize itself (see FIG. 16). One way to implement the reset circuit involves an RC circuit, such as that shown in FIG. 17. However, it is also possible to implement the reset circuit using a voltage comparator if more precision is desired. In the voltage comparator implementation of FIG. 18; the divided supply voltage (Vp) is compared to the threshold voltage (Vth), and the reset signal is asserted whenever Vp is below Vth. The reset output may be either active high or active low. The reset output may be configured as either push/pull or open drain.

In some cases, it may be desirable to endow the peripheral device with user-settable write-protect indication to prevent the unintentionally alteration of the information, such as information stored in storage device (e.g., removable flash media). An implementation of the write protect logic may include a write protect switch and a detect circuit.

Figure 19A:
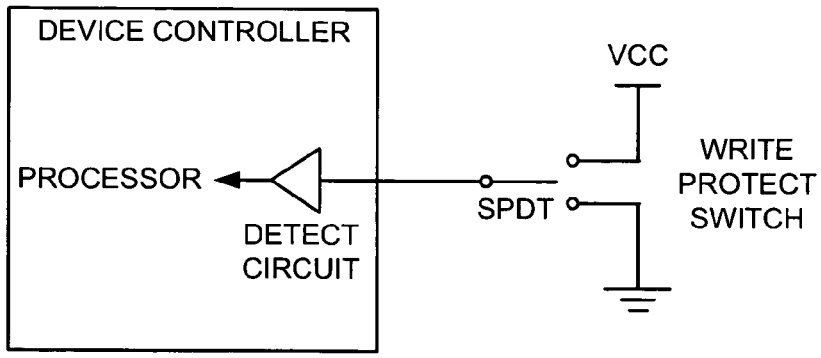
FIG. 19 shows, in accordance with an embodiment of the present invention, a write-protection arrangement.
Figure 19B:
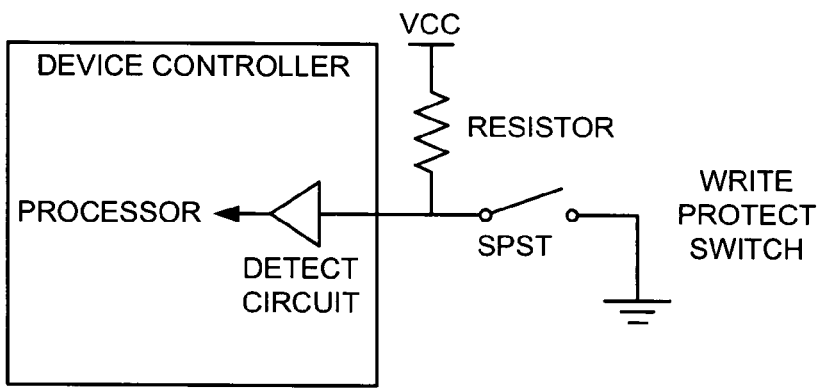
Figure 19C:
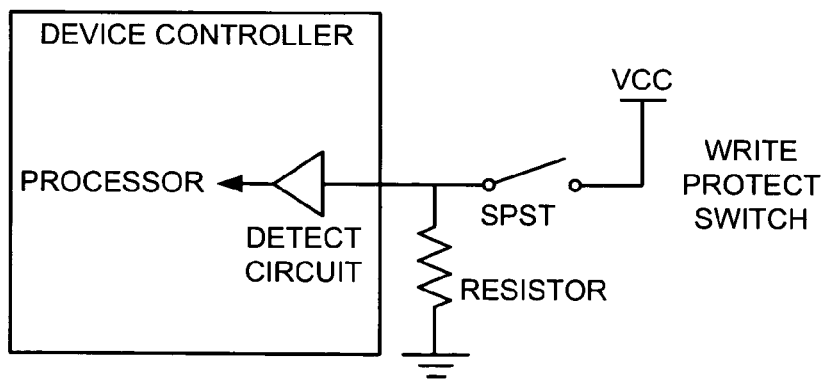

In one embodiment, the user may manually set the write protect switch to produce to the detect circuit two electrical polarities, i.e. enable or disable. The detect circuit normally may be an input port or general purpose input/output (GPIO) port of the device controller. The detected polarity is then used to instruct the processor to govern the write behavior to the storage subsystem of the peripheral device. In other words, the write access is prohibited if the write protect switch is enabled; otherwise the write access is allowed. FIGS. 19A, 19B and 19C illustrate respectively implementations using a single pole double throw (SPDT) switch, a single pole single throw (SPST) switch whereby the pull up resistor sets the default polarity as high, and single pole single throw (SPST) switch whereby a pull down resistor sets the default polarity as low. Applications can include flash drives, USB connectors on desktop computers, notebook computers, Pocket PCs, Handy Terminals, Personal Communicators, PDA's, digital cameras, cellular phones with or without digital cameras, TV set-top boxes, MP3, MPEG4, copiers, printers, and other electronic devices. Such devices may use to have advantage of the higher speed offered by the extended modes of the extended USB connectors and sockets, and may reduce size and space together with lower cost compared with larger card-type or dual-plug connectors. Legacy USB devices and hosts are supported, so the extended hosts and peripherals can freely operate with other legacy peripherals and hosts using standard USB mode.

Additional metal contacts can be added to the new connectors and sockets. These additional metal contacts can serve as power, ground, and/or I/O pins which are further extensions to the USB specification, or PCI Express or other specifications. Greater power capability can be obtained with (or without) additional power and ground pins (or by a higher power supply current of the existing power pin). Multiple power supplies can also be provided by the additional power and ground pins. The improved power supply capabilities allow more devices and/or more memory chips to be powered.

Extra I/O pins can be added for higher bandwidth and data transfer speeds. The additional I/O pins can be used for multiple-bit data I/O communications, such as 2, 4, 8, 12, 16, 32, 64, . . . bits. By adopting some or all of these new features, performance of hosts and peripheral devices can be significantly improved. These additional pins could be located behind or adjacent to the existing USB pins, or in various other arrangements. The additional pins could be applied to male and female connector.

To reduce the number of extended pins, the four original USB pins can be shared. One embodiment has a total of 10 pins, shown in FIG. 12. Two of the differential signal pins for PCI-Express, Serial-ATA, and IEEE 1394 can be shared with the 2 differential data pins of USB. The same scheme can be applied to the ExpressCard connector. There is no change for the 4 pins related to USB. For the PCI Express signals, only PETn, PETp, PERn and PERp need to be modified to include the corresponding signals for 1394, SATA and SA-SCSI. Other PCI-related signals can be mapped also.

PCIE system bus management functions can be achieved by the differential pairs of the USB/PCIE interface without using side-band signals. Clock signals such as REFCLK+ and REFCLK− are important signals to add if additional pins are available. If even more pins are available, the side band signals in ExpressCard can be added, like CPPE#, CPUSB#, CLKREQ#, PERST#, WAKE#, +3.3AUX, SMB-DATA, SMBCLK, etc. Also, the approach of using the modified PCI Express signals can be applied to the designs of the fully buffered memory modules of DRAMs.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A peripheral device, comprising:
   a device processor;
   a set of protocol processors having at least a first protocol processor, said set of protocol processors being operatively coupled to communicate with said device processor, said first protocol processor being configured to process a first protocol; and
   an extended Universal Serial Bus (USB) plug configured to be pluggable into an industry-standard Series A USB socket, said extended USB plug also being configured to facilitate communication between said device processor and a host computer configured to be detachably coupled with said extended USB plug, said extended USB plug lacking an industry-standard Series A USB cover associated with an industry-standard Series A USB plug, said extended USB plug including
an extended pin substrate having an extended substrate length longer than a length of a pin substrate of said industry-standard Series A USB plug, said length of said pin substrate of said industry-standard Series A USB plug being about 12 mm;
a plurality of USB plug contacts supported by said extended pin substrate and arranged in a first plug row in a direction perpendicular to a longitudinal axis of said extended USB plug, said plurality of USB plug contacts being configured to carry USB signals; and
a plurality of non-USB plug contacts supported by said extended pin substrate and arranged in a second plug row parallel to said first plug row, said plurality of non-USB plug contacts being configured to carry non-USB signals;
wherein said extended USB plug is configured to detachably couple with said industry-standard Series A USB socket and an extended USB socket alternatively, said extended USB socket including an extended cavity having an extended cavity length longer than a length of a cavity of said industry-standard Series A USB socket, said length of said cavity of said industry-standard Series A USB socket being about 9 mm, and a plurality of USB socket contacts arranged in a first socket row in a direction perpendicular to a longitudinal axis of said extended USB socket, said plurality of USB socket contacts being disposed in said cavity and configured to carry said USB signals, and a plurality of non-USB socket contacts arranged in a second socket row parallel to said first socket row, said plurality of non-USB socket contacts being configured to carry said non-USB signals and wherein said plurality of non-USB plug contacts being disposed on an opposite substrate side of said extended pin substrate relative to said plurality of USB plug contacts, said plurality of non-USB plug contacts being recessed below one of a surface of said opposite substrate side and insulating ribs that are disposed proximate said plurality of non-USB plug contacts, thereby preventing said plurality of non-USB plug contacts from making physical contact with a component of said industry-standard Series A USB socket when said extended USB plug is fully inserted into said industry-standard Series A USB socket.

2. The peripheral device of claim 1 wherein a height of said extended USB plug is less than a height of said industry-standard Series A USB plug, said height of said industry-standard Series A USB plug being about 7.5 mm.

3. The peripheral device of claim 1 wherein said set of protocol processors further includes a second protocol processor operatively coupled to communicate with said device processor, said second protocol processor being configured to process a second protocol different from said first protocol.

4. The peripheral device of claim 3 wherein said second protocol is SATA.

5. The peripheral device of claim 3 wherein said second protocol is 1394.

6. The peripheral device of claim 3 wherein said second protocol is PCI Express.

7. The peripheral device of claim 1 wherein said set of protocol processors further includes a second protocol processor operatively coupled to communicate with said device processor, said second protocol processor being configured to process a second protocol different from said first protocol, said peripheral device further includes:
a multi-personality bus switch operatively coupled to said plurality of non-USB plug contacts and said second protocol processor, said multi-personality bus switch being configured to transmit non-USB signals received via said second protocol processor to said non-USB plug contacts if said host computer communicates using said second protocol.

8. The peripheral device of claim 7 further comprising a mode light emitting diode (LED) for indicating which protocol is currently employed for communication by said peripheral device.

9. The peripheral device of claim 7 further comprising a reset circuit for resetting said peripheral device.

10. The peripheral device of claim 7 further comprising a write-protect mechanism, said write-protect mechanism, when activated, prevents a user from inadvertently writing to said peripheral device.

11. The peripheral device of claim 7 wherein said set of protocol processors further includes a third protocol processor operatively coupled to communicate with said device processor, said third protocol processor being configured to process a third protocol different from said first protocol and said second protocol, said multi-personality bus switch being coupled with said third protocol processor, said multi-personality bus switch being configured to transmit said non-USB signals received via said third protocol processor to said non-USB plug contacts if said host computer communicates using said third protocol.

12. The peripheral device of claim 11 wherein said second protocol represents one of PCI Express, SATA, SAS and 1394 and said third protocol represents another one of said PCI Express, said SATA, said SAS and said 1394.

13. The peripheral device of claim 11 further comprising a personality selector circuit coupled to said multi-personality bus switch, said personality selector circuit being configured to configure said multi-personality switch to employ one of said second protocol processor or said third protocol processor for communication.

14. The peripheral device of claim 13 wherein said non-USB signals are analyzed by said device processor to ascertain a personality of said host computer, a result of an analysis of said non-USB signals enabling said personality selector to configure said multi-personality switch for said communication.

15. The peripheral device of claim 7 wherein said second protocol represents one of PCI Express, SATA, SAS and 1394.

16. The peripheral device of claim 15 wherein said first plug pin plug row are disposed on a first side of said extended pin substrate, said second plug pin plug row are disposed on a second side of said extended pin substrate that is opposite said first side of said extended pin substrate.

17. The peripheral device of claim 15 wherein said first protocol is USB, said first protocol processor receives communication from said host computer when said host computer communicates in said first protocol irrespective whether said host computer employs said industry-standard Series A USB socket or said extended USB socket.

18. The peripheral device of claim 15 wherein said first plug row consists of four pins and said second plug row consists of 8 pins.

19. The peripheral device of claim 15 wherein said first plug row consists of four pins and said second plug row consists of 6 pins.

20. The peripheral device of claim 15 wherein said second plug row is recessed below a surface of said extended pin substrate.

21. The peripheral device of claim 1, wherein said plurality of non-USB plug contacts are recessed below said surface of said opposite substrate side.

22. The peripheral device of claim 1, wherein said plurality of non-USB plug contacts are recessed below said insulating ribs.

23. A peripheral device, comprising:
  a device processor;
  a set of protocol processors having at least a first protocol processor, said set of protocol processors being operatively coupled to communicate with said device processor, said first protocol processor being configured to process a first protocol; and
  an extended Universal Serial Bus (USB) plug configured to be pluggable into an industry-standard Series A USB socket, said extended USB plug also being configured to facilitate communication between said device processor and a host computer configured to be detachably coupled with said extended USB plug, said extended USB plug lacking an industry-standard Series A USB cover associated with an industry-standard Series A USB plug,
  said extended USB plug including
    an extended pin substrate having an extended substrate length longer than a length of a pin substrate of said industry-standard Series A USB plug, said length of said pin substrate of said industry-standard Series A USB plug being about 12 mm; and
    a plurality of non-USB plug contacts supported by said extended pin substrate and arranged in a first plug row in a direction perpendicular to a longitudinal axis of said extended USB plug, said plurality of non-USB plug contacts being configured to carry non-USB signals, said plurality of non-USB contacts being physically arranged on said extended pin substrate such that said plurality of non-USB contacts would not electrically couple with a plurality of USB socket contacts of said industry-standard Series A USB socket when said extended USB plug is fully inserted into said industry-standard Series A USB socket;
  wherein said extended USB plug is configured to detachably couple with said industry-standard Series A USB socket and an extended USB socket alternatively, said extended USB socket including an extended cavity having an extended cavity length longer than a length of a cavity of said industry-standard Series A USB socket, said length of said cavity of said industry-standard Series A USB socket being about 9 mm, and a plurality of non-USB socket contacts arranged in a first socket row in a direction perpendicular to a longitudinal axis of said extended USB socket, said plurality of non-USB socket contacts being configured to carry said non-USB and wherein said plurality of non-USB plug contacts being disposed on an opposite substrate side of said extended pin substrate, said opposite substrate side being configured to not be adjacent to said plurality of USB socket contacts of said industry-standard Series A USB socket if said extended USB plug is fully inserted into said industry-standard Series A USB socket.

24. The peripheral device of claim 23 wherein a height of said extended USB plug is less than said industry-standard Series A USB plug, said height of said industry-standard Series A USB plug being about 7.5 mm.

25. The peripheral device of claim 23 further comprising a reset circuit for resetting said peripheral device.

26. The peripheral device of claim 23 further comprising a write-protect mechanism, said write-protect mechanism, when activated, prevents a user from inadvertently writing to said peripheral device.

27. The peripheral device of claim 23 wherein said non-USB signals represent 1394 signals.

28. The peripheral device of claim 23 wherein said non-USB signals represent PCI Express signals.

29. The peripheral device of claim 23 wherein said non-USB signals represent SAS signals.

30. The peripheral device of claim 23 wherein said non-USB signals represent SATA signals.

31. The peripheral device of claim 23, wherein said plurality of non-USB plug contacts are recessed below said surface of said opposite substrate side.

32. The peripheral device of claim 23, wherein said plurality of non-USB plug contacts are recessed below said insulating ribs.

33. The peripheral device of claim 23 wherein said set of protocol processors further includes a second protocol processor operatively coupled to communicate with said device processor, said second protocol processor being configured to process a second protocol different from said first protocol, said peripheral device further includes:
  a multi-personality bus switch operatively coupled to said plurality of non-USB plug contacts and said first protocol processor and said second protocol processor, said multi-personality bus switch being configured to transmit non-USB signals received via said first protocol processor to said non-USB plug contacts if said host computer communicates using said first protocol, said multi-personality bus switch being configured to transmit non-USB signals received via said second protocol processor to said non-USB plug contacts if said host computer communicates using said second protocol.

34. The peripheral device of claim 33 wherein said first plug row are disposed on a first side of said extended pin substrate opposite a second side of said extended pin substrate, said second side of said extended pin substrate being configured to be adjacent to said USB socket contacts of said industry-standard Series A USB socket if said extended USB plug is fully inserted into said industry-standard Series A USB socket.

35. The peripheral device of claim 33 wherein said first plug row are disposed on a first side of said extended pin substrate, at least a portion of said first side of said extended pin substrate that does not have pins being configured to be adjacent to said USB socket contacts of said industry-standard Series A USB socket if said extended USB plug is fully inserted into said industry-standard Series A USB socket.

36. The peripheral device of claim 33 further comprising a mode light emitting diode (LED) for indicating which protocol is currently employed for communication by said peripheral device.

37. The peripheral device of claim 33 wherein said first protocol represents one of PCI-Express, SATA, SAS and 1394 and said second protocol represents another one of said PCI-Express, said SATA, said SAS and said 1394.

38. The peripheral device of claim 37 wherein said first plug row consists of 8 pins.

39. The peripheral device of claim 37 wherein said first plug row consists of 6 pins.

40. The peripheral device of claim 37 wherein said first plug row includes at least 4 pins.

41. The peripheral device of claim 37 wherein said first plug row is recessed below a surface of said extended pin substrate.

42. The peripheral device of claim 37 further comprising a personality selector circuit coupled to said multi-personality bus switch, said personality selector circuit being configured to configure said multi-personality switch to employ one of said first protocol processor or said second protocol processor for communication.

43. The peripheral device of claim 42 wherein said non-USB signals are analyzed by said device processor to ascertain a personality of said host computer, a result of an analysis of said non-USB signals enabling said personality selector to configure said multi-personality switch for said communication.

* * * * *